United States Patent
Dietz et al.

(10) Patent No.: US 12,153,979 B1
(45) Date of Patent: Nov. 26, 2024

(54) CARD FOR IDENTIFYING A TONE OF A SAMPLE OF HUMAN SKIN

(71) Applicant: KAO CORPORATION, Tokyo (JP)

(72) Inventors: Hailey H. Dietz, Fort Mitchell, KY (US); Jennifer D. Carson, Cincinnati, OH (US); Ryan M. Forsthoefel, Wilder, KY (US); Kotatsu Bito, Tokyo (JP); Ryan D. Barton, Fairfield, OH (US); Justin M. Klausing, West Chester, OH (US)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 18/345,681

(22) Filed: Jun. 30, 2023

(51) Int. Cl.
*G06K 19/06* (2006.01)

(52) U.S. Cl.
CPC ... *G06K 19/0614* (2013.01); *G06K 19/06028* (2013.01)

(58) Field of Classification Search
CPC ............ G06K 19/0614; G06K 19/06028
USPC ......................................................... 235/494
See application file for complete search history.

(56) References Cited

U.S. PATENT DOCUMENTS

| | | | |
|---|---|---|---|
| 4,199,877 A | 4/1980 | Akiyama | |
| 6,628,829 B1 | 9/2003 | Chasen | |
| 9,823,131 B2 | 11/2017 | Vogh, Jr. et al. | |
| 10,049,294 B2 | 8/2018 | Vogh, Jr. et al. | |
| 10,213,007 B2 | 2/2019 | Lucet-Levannier et al. | |
| 2014/0305466 A1* | 10/2014 | Silva .................... | A45D 40/24 132/314 |
| 2018/0374140 A1* | 12/2018 | Stucki ................. | G06V 40/168 |
| 2020/0056943 A1* | 2/2020 | Douglas-Sydnor ..... | G01J 3/526 |
| 2023/0368878 A1* | 11/2023 | Molenda ............... | G16H 70/60 |
| 2024/0075402 A1* | 3/2024 | O'Connell ............. | G02B 30/56 |

FOREIGN PATENT DOCUMENTS

| | | |
|---|---|---|
| CN | 110400278 B | 10/2021 |
| JP | H09-262135 A | 10/1997 |

OTHER PUBLICATIONS

DIC Color Guide, <https://www.dic-global.com/en/contents/Scene diccolorguide/> retrieved from the internet; accessed on Jan. 5, 2023.

(Continued)

*Primary Examiner* — Allyson N Trail
(74) *Attorney, Agent, or Firm* — Oblon, McClelland, Maier & Neustadt, L.L.P.

(57) ABSTRACT

A card includes a plurality of tiles: (i) a first set, each having a HEX value representing a shade of grey-scale, (ii) a second set, each having a HEX value representing a same shade of grey, (iii) a plurality of skin-toned tiles each having a HEX value representing a tone of human skin, and (iv) a plurality of color tiles arranged in a set of four zones positioned among the first and the second set of tiles. Each zone includes a first and a second color tile, each having a HEX value representing a color different from (i) the first set, (ii) the second set, and (iii) the plurality of skin-toned tiles. The first and the second color tile are positioned non-adjacent to each other such that an angle measured between an outer-inside corner of both color tiles and a center point of an aperture ranges from 30° to 60°.

20 Claims, 21 Drawing Sheets
(18 of 21 Drawing Sheet(s) Filed in Color)

(56) References Cited

OTHER PUBLICATIONS

Macbeth ColorChecker, <https://www.chromaxion.com/Information/colorchecker.html>, retrieved from the internet; accessed on Jan. 5, 2023.
Pantone Skintone Guide, <https://www.pantone.com/products/fashion-home-interiors/skintone-fillide>, retrieved from the internet; accessed on Oct. 25, 2022.
X-Rite Pantone® Color Checker, <https://www.xrite.com/categories/calibration-PII) J!?cg/colorchecker-classic>, retrieved from the internet; accessed on Feb. 27, 2023.
Yanko Design Pantone®, <https://www.yankodesign.com/2020/07/01/pantones-15-rainbow-card-turns-your-smartphone-camera-into-a-highly-accurate-color picker/>, retrieved from the internet; accessed on Feb. 27, 2023.
International Search Report issued in International Application No. PCT/US2024/035518 on Aug. 5, 2024.
Written Opinion of the International Searching Authority issued in International Application No. PCT/US2024/035518 on Aug. 5, 2024.

\* cited by examiner

CARD FOR IDENTIFYING A TONE OF A SAMPLE OF HUMAN SKIN

FIELD OF TECHNOLOGY

The present application relates to skin tone identification, and in particular, a card for identifying a tone of a sample of human skin.

BACKGROUND

Products exist to determine the tone of a color, for instance, to match colors for paint, fabrics, or skin tone. While such technologies have proven useful in such applications, issues still exist. For instance, a chart may not have an exact match to the color or skin tone or may be difficult to place in relation to a sample for comparison. A software application for computer or mobile phone may require particular lighting and angles to obtain a proper reading of a sample. This can result in frustration to a user, as well as an improper determination of color or skin tone.

Certain charts, or cards, have been specifically developed for helping a user to determine a tone of a sample of color. One such chart is the GretagMacbeth™ ColorChecker Color Rendition Chart (also known as the Macbeth ColorChecker), owned by X-Rite, Inc., which is a chart shaped as a rectangle having a plurality of tiles. The tiles are arranged in rows, and each tile is of a different color. However, a sample of color cannot be placed with respect to this chart for a proper comparison, and no corrective features appear to be provided with the chart.

The PANTONE® Color Checker is a card which has a shape of a rectangle with four edges, four corners, an area, and a center point. The card includes a group of four barcode regions, for identifying the card as unique from another such card. The card also includes an aperture, for placement over the sample of color, centered around the center point. The aperture has a shape of a square, four edges, and four corners. The card further includes a plurality of tiles surrounding the aperture, each tile having a shape of a square and a HEX value for providing a comparison and contrast against the sample of color. However, the PANTONE® Color Checker is not used for determining skin tones. Meanwhile, a counterpart tool, the PANTONE® Skin-Tone™ Guide, is a grid used for determining a tone of a sample of skin. However, the grid is not set up for placing a sample of skin under an aperture to be surrounded by, and compared to, tiles representing varying skin tones. Furthermore, neither tool appears to have any built-in corrective features.

Thus, a need exists for a chart or card that allows a user to determine their skin tone by doing a proper, side-by-side comparison of their skin to a spectrum of pre-determined representative skin tones. Also, a need exists for a chart or card that has built-in corrective features, such as image correction to account for uneven illumination, color correction, illuminance difference measurement, and gamma measurement of the sample of skin. Furthermore, industry standard provides that ΔE<3 is an acceptable limit for color accuracy in mobile applications. Thus, there is room for improvement, i.e., an even smaller ΔE, for color accuracy in mobile applications.

While cards have been made and used, it is believed that no one prior to the inventors has made or used the invention described in the appended claims. For example, it would be beneficial to determine a skin tone to aid in the selection of skincare products or other products suitable for a particular skin tone.

SUMMARY

The present application provides a card including a plurality of tiles. The plurality of tiles includes: (i) a first set of tiles, each having a HEX value representing a shade of grey-scale, (ii) a second set of tiles, each having a HEX value representing a same shade of grey, (iii) a plurality of skin-toned tiles each having a HEX value representing a tone of human skin, and (iv) a plurality of color tiles arranged in a set of four zones, each zone positioned among the first set and the second set of tiles. Each zone includes a first color tile and a second color tile, each having a HEX value representing a color different from the first set of tiles, the second set of tiles, and the plurality of skin-toned tiles. The first color tile and the second color tile each have an outer-inside corner. The first color tile and the second color tile are positioned non-adjacent to each other such that an angle as measured between the outer-inside corner of both color tiles and a center point of an aperture ranges from 30° to 60°.

The card of the present application includes a plurality of tiles having finely-tuned HEX values. Some of the HEX values represent skin tones, others are on the grey-scale, and still others are colors belonging to neither of these categories. The tiles are finely-positioned in such a way as to provide a built-in image correction to account for uneven illumination, color correction, illuminance difference measurement, and gamma measurement of the sample of skin.

BRIEF DESCRIPTION OF THE FIGURES

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

To the extent that spatial terms such as "top," "bottom," "upper," "lower," "vertical," "horizontal," or the like are used herein with reference to the drawings, it will be appreciated that such terms are used for exemplary description purposes only and are not intended to be limiting or absolute.

Numerical values of dimensions and measurements presented in the following description are understood to have a +/−1% tolerance.

I. First Example of a Card

Figure 1A:
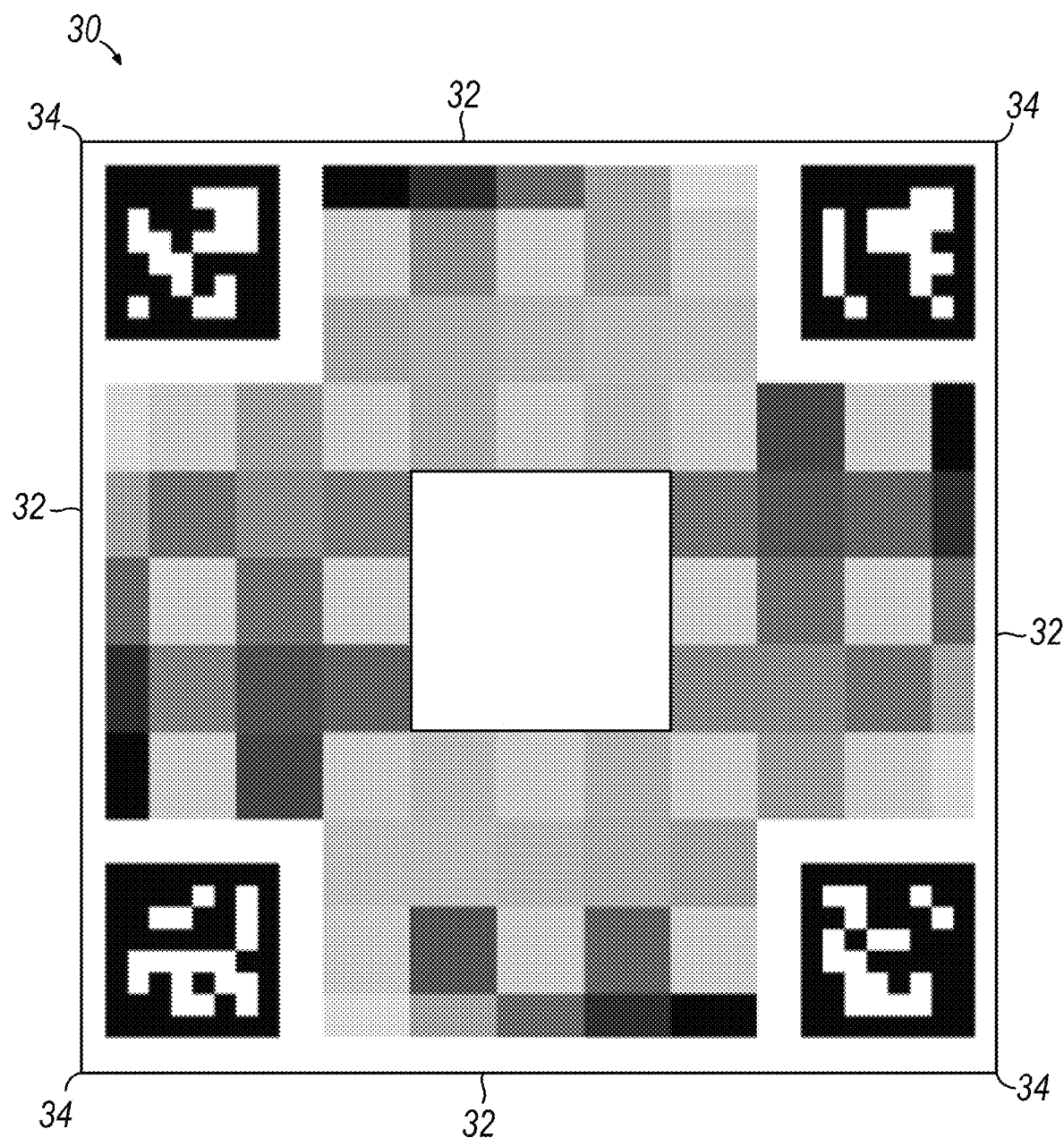
FIG. 1A illustrates an example of a card for identifying a tone of a sample of human skin.
Figure 1B:
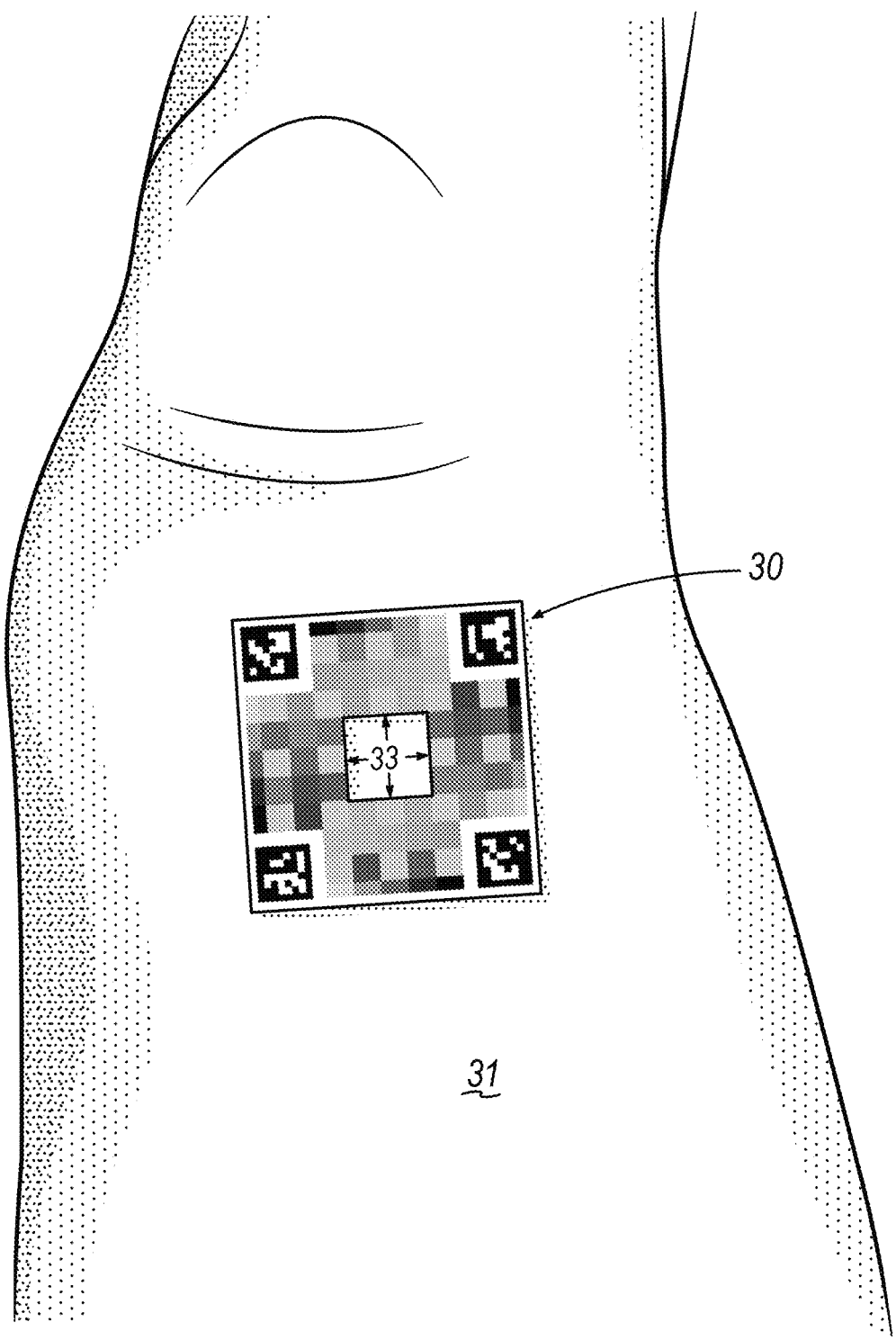
FIG. 1B illustrates the card of FIG. 1A placed over a sample of human skin.
Figure 2:
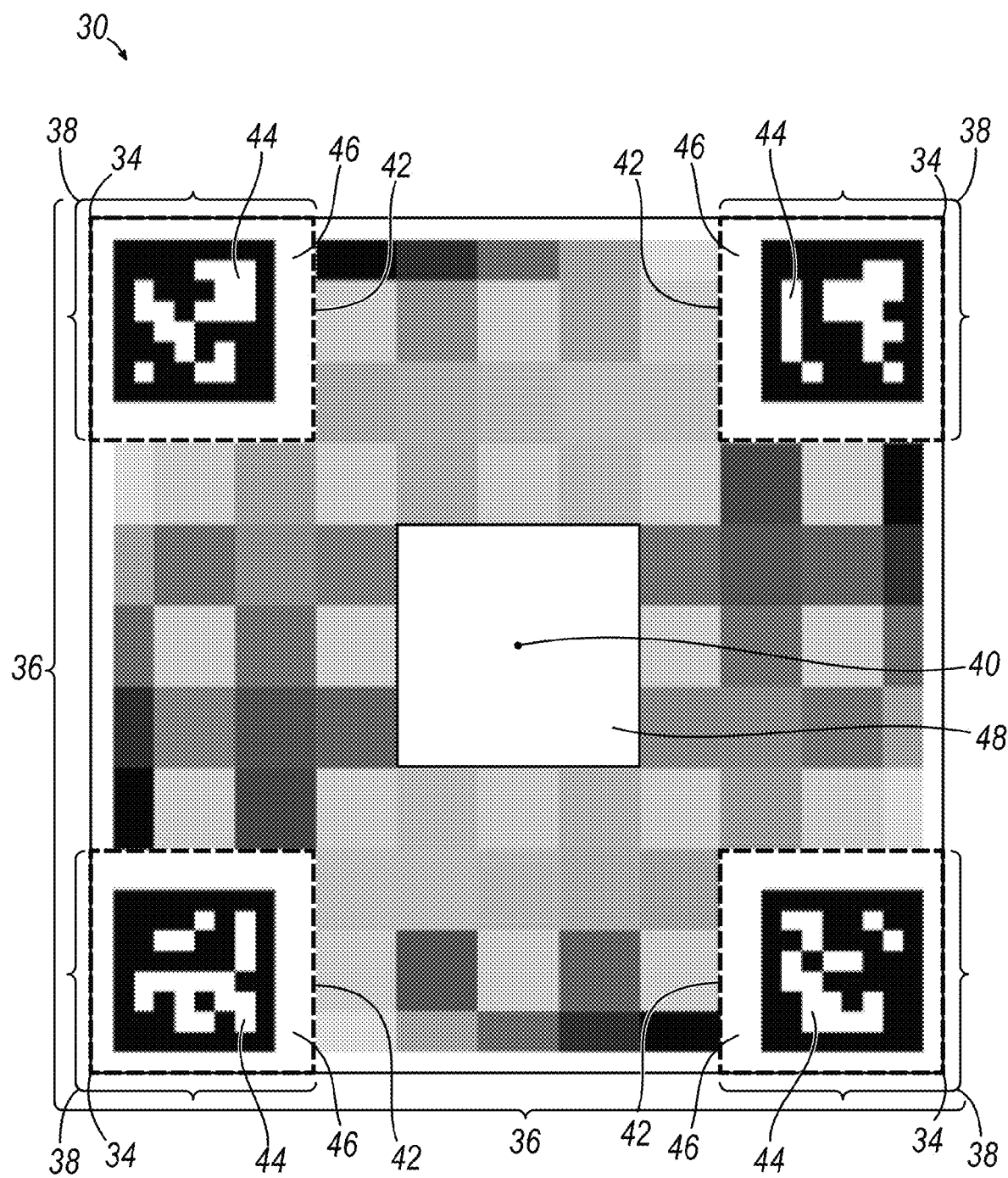
FIG. 2 highlights various features of the card of FIG. 1A.

As first illustrated in FIGS. 1A-1B, a card 30 for identifying a tone of a sample of human skin from a human body part 31 is presented. The sample of human skin 33 is typically from a hand or a forearm of a person but can be from any area of a human body. The card 30 has a shape of a square with four edges 32 and four corners 34. As indicated in FIG. 2, the card 30 also has an area 36, four corner areas 38 positioned at a respective corner 34, and an aperture 48 with a center point 40, detailed further below. As further detailed in FIG. 2, each of the corner areas 38 is a portion of the area 36 and are all of a same size. The area 36 of the card may range, for instance, from 484 mm$^2$ (22 mm×22 mm) to 5929 mm$^2$ (77 mm×77). Each corner area 38 may have an area ranging, for instance, from 36 mm$^2$ (6 mm×6 mm) to 441 mm$^2$ (21 mm×21 mm). In one version, the area 36 of the card 30 may be 3025 mm$^2$ (55 mm×55 mm). In such a version, each corner area 38 has an area of 225 mm$^2$ (15 mm×15 mm). In another version, the area 36 of the card 30 may be 1936 mm$^2$ (44 mm×44 mm) or 2025 mm$^2$ (45 mm×45 mm). In such a version, each corner area 38 has an area of 144 mm$^2$ (12 mm×12 mm). All of the versions described are envisioned.

FIG. 2 also indicates that the card 30 includes a group of four barcode regions 42 for identifying the card 30 as unique from another such card 30, and for identifying a layout and orientation of the card 30. In one version, each barcode region 42 has a unique ArUco barcode 44, shaped as a square with four edges and four corners. Each barcode region 42 fills a respective corner area 38. In another version, each ArUco barcode 44 is fully surrounded by a margin 46. In one version, the margin 46 is white and may extend, for instance, from 0.5 mm to 4 mm between the ArUco barcode 44 and a plurality of tiles 56, discussed further below. In another version, the margin may extend 2 mm between the ArUco barcode 44 and a plurality of tiles 56. In a further version, the margin 46 may extend, for instance, from 0.5 mm to 4 mm around each edge of the ArUco barcode 44. For example, the margin 46 may extend 2 mm around each edge of the ArUco barcode 44. All of the versions described are envisioned.

Figure 3:
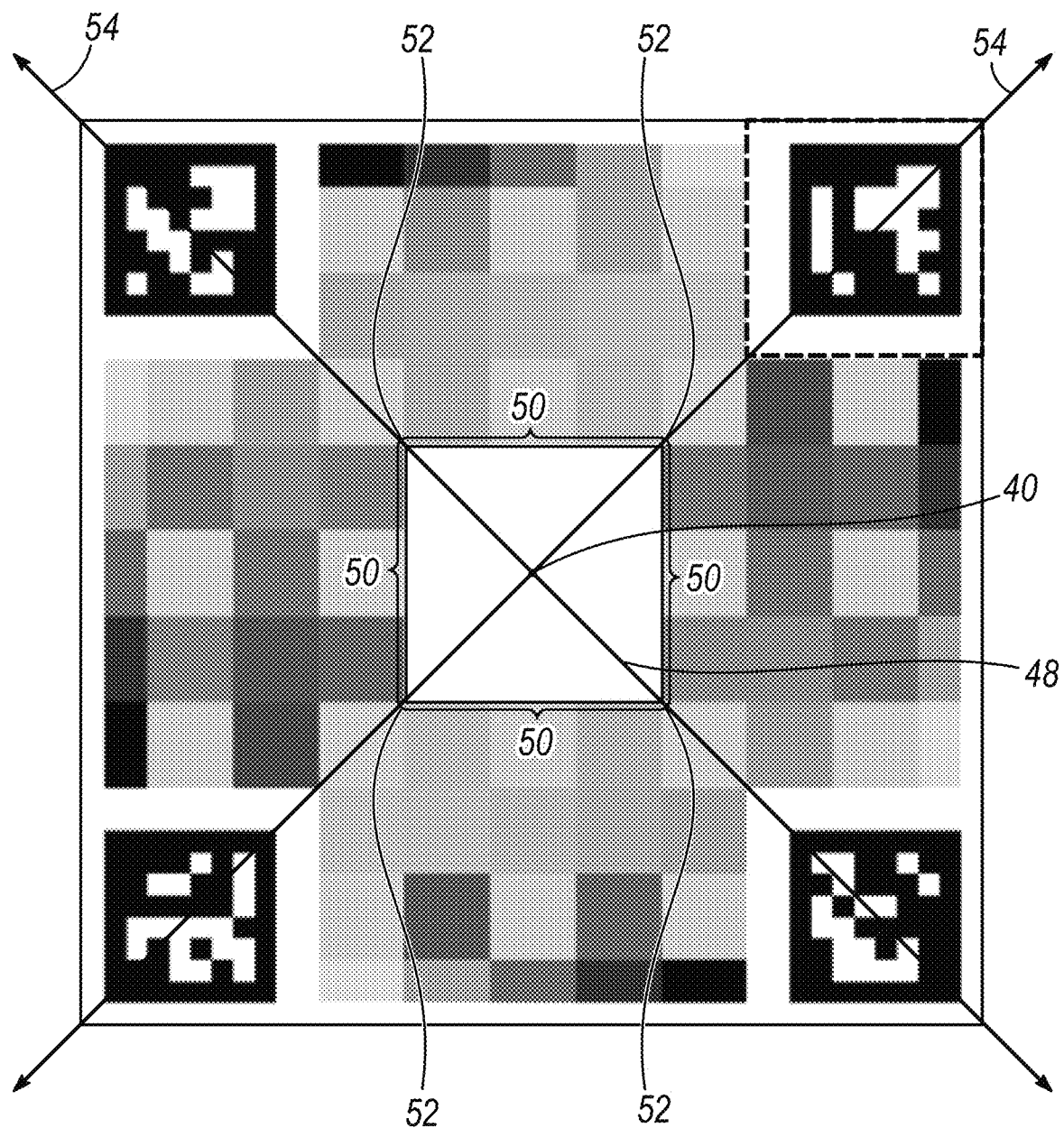
FIG. 3 highlights other various features of the card of FIG. 1A.

Further illustrated in FIG. 2, the card 30 also includes an aperture 48 for placement over the sample of human skin. In one version, the center point 40 is of the aperture 48, and the aperture 48 is centered at the center point 40. As indicated in FIG. 3, the aperture 48 has a shape of a square, four edges 50, and four corners 52. In one version, the aperture 48 is of the same size as the corner areas 38. That is, the aperture 48 may have an area ranging, for instance, from 36 mm$^2$ (6 m×6 mm) to 441 mm$^2$ (21 mm×21 mm). In one version, the aperture 48 may have an area of 225 mm$^2$ (15 mm×15 mm). In another version, the aperture 48 may have an area of 144 mm$^2$ (12 mm×12 mm). In such a version, each barcode region 42 is spaced diagonally from the aperture 48 along a pair of perpendicular diagonal axes 54. Specifically, each barcode region 42 may be equally spaced diagonally from the aperture 48. All of the versions described are envisioned.

Figure 4:
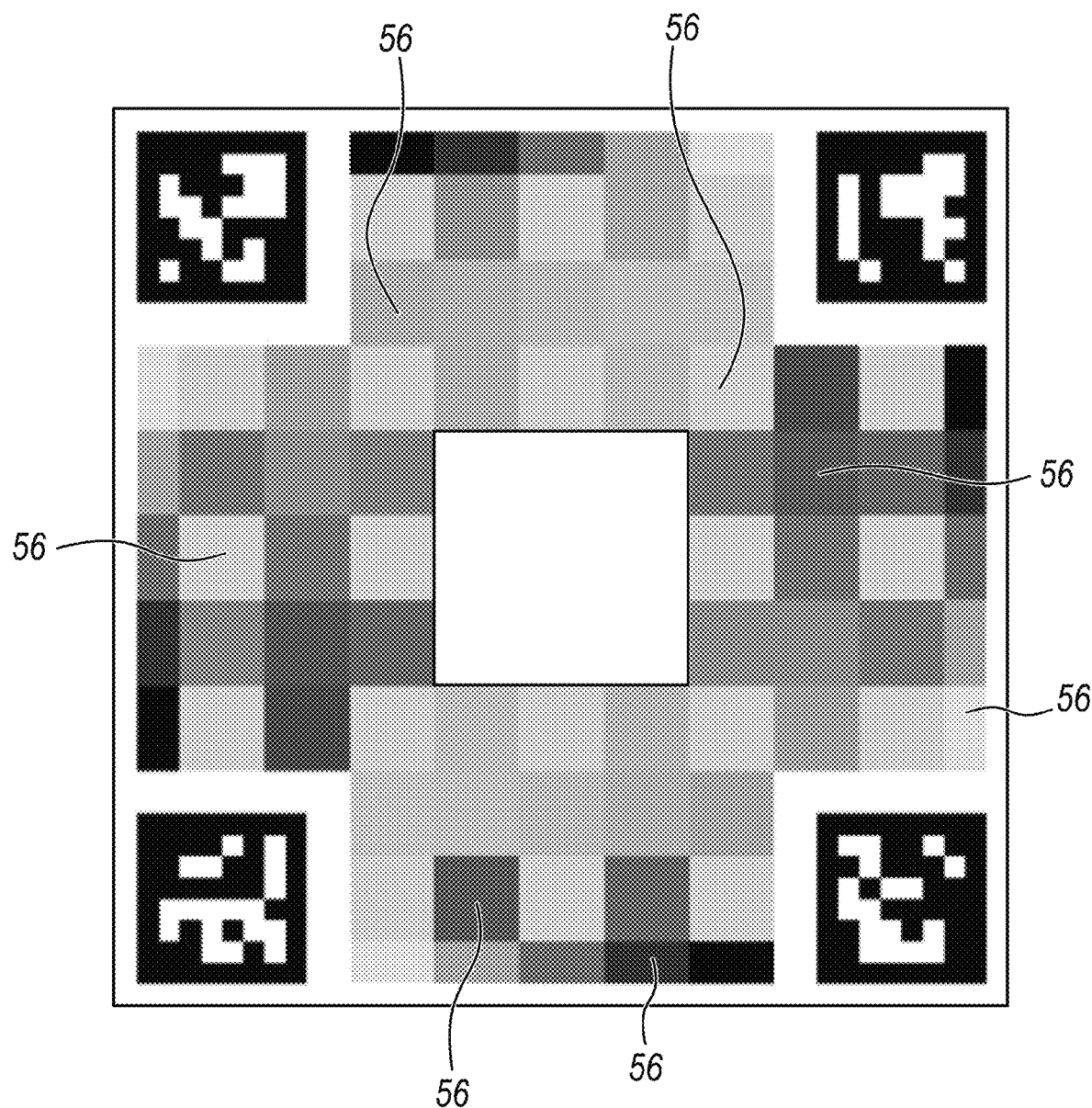
FIG. 4 highlights further various features of the card of FIG. 1A.

The card 30 further includes a plurality of tiles 56 (representatives of which are indicated in FIG. 4) surrounding the aperture 48. Each tile 56 has a HEX value for providing a comparison and contrast against the sample of human skin. Some of the HEX values represent skin tones, others are on the grey-scale, and still others are colors belonging to neither of these categories. The tiles 56 are chosen in such a way as to provide a built-in image correction to account for uneven illumination, color correction, illuminance difference measurement, and gamma measurement of the sample of human skin.

Each tile 56 has a shape of a square. Each tile 56 may have an area ranging, for instance, from 4 mm$^2$ (2 mm×2 mm) to 49 mm$^2$ (7 mm×7 mm). In one version, each tile 56 may have an area of 25 mm$^2$ (5 mm×5 mm). In another version, each tile 56 may have an area an area of 16 mm$^2$ (4 mm×4 mm). In such a version, the card 30 may fit comfortably on a forearm of a person. Also, multiple cards 30 may be printed from a single sheet of paper or cardstock. All of the versions described are envisioned.

Each barcode region 42 may be, for instance, from 4 to 10 times larger in area than each tile 56. For example, each barcode region 42 may be 9 times larger in area than each tile 56. All of the versions described are envisioned.

The aperture 48 may be, for instance, from 4 to 10 times larger in area than each tile 56. For example, the aperture 48 may be 9 times larger in area than each tile 56. All of the versions described are envisioned.

First Set of Tiles

Figure 5A:
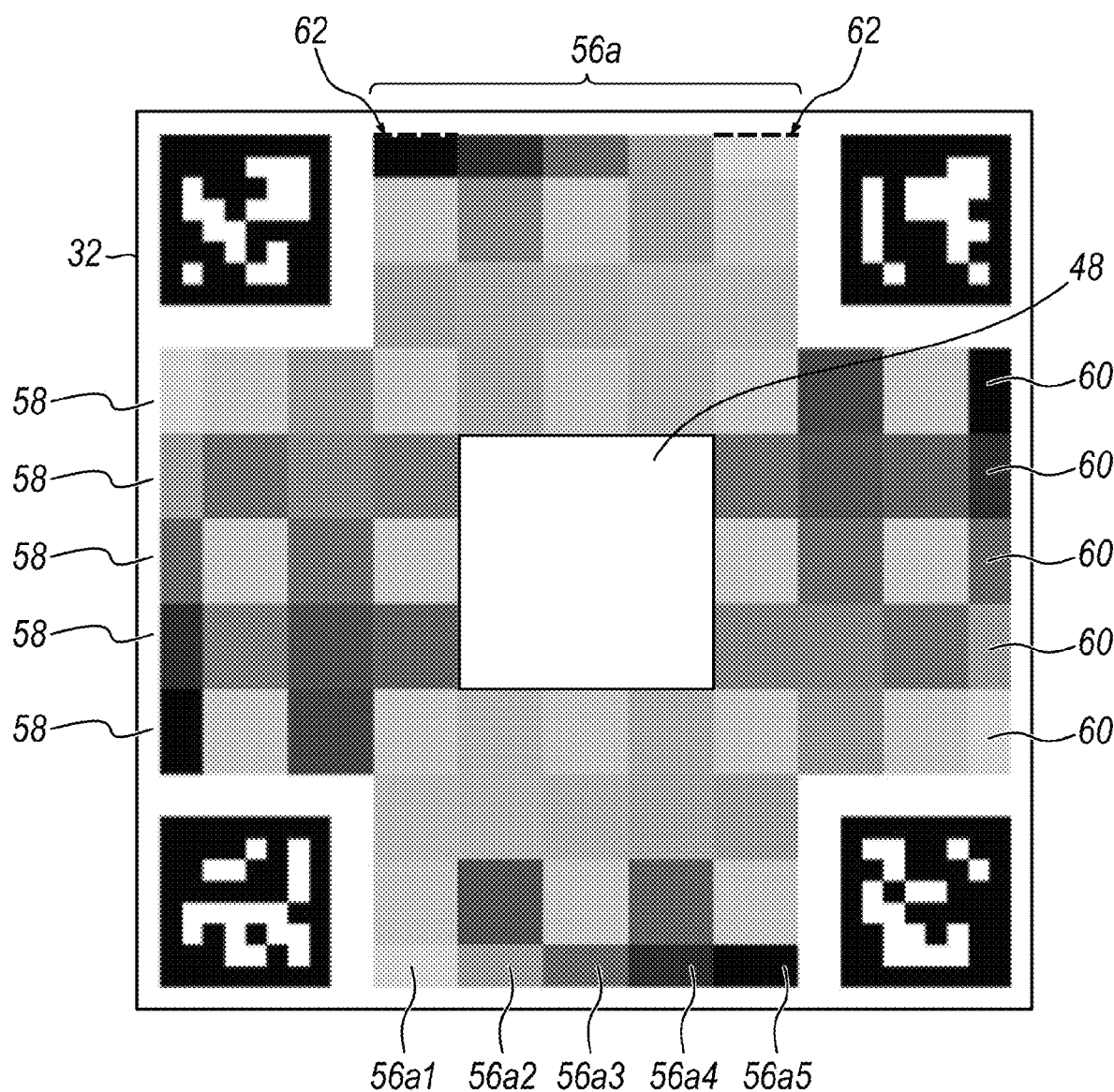
FIG. 5A highlights yet further various features of the card of FIG. 1A.
Figure 5B:
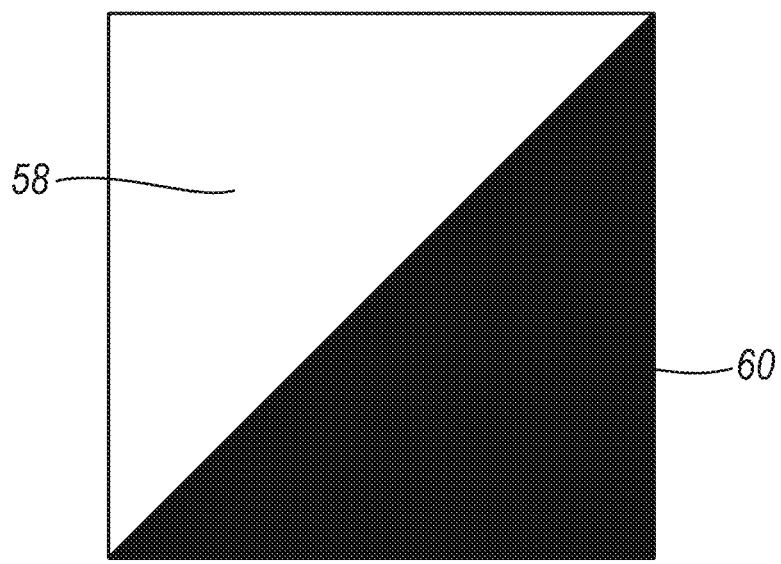
FIG. 5B illustrates an alternative feature of the card of FIG. 1A.

As detailed in FIG. 5A, the plurality of tiles 56 includes a first set of tiles 56a. The first set of tiles 56a includes twenty such tiles 56a. Each tile 56a has a HEX value representing a shade of grey-scale. In one version, a first portion 58 of each tile 56a is white, and a second portion 60 of each tile 56a has a HEX value representing a shade of grey-scale. In one version, the two portions 58, 60 are two rectangles separated by a dividing line 62. In another version, the two portions 58, 60 are two right triangles separated by a diagonal (FIG. 5B). The first portion 58 faces towards a respective edge 32 of the card 30, adjacent to the respective edge 32 of the card 30. The second portion 60 faces towards the aperture 48. In one version, the first portion 58 and the second portion 60 each make up half of a tile 56a. The first set of tiles 56a allows for illuminance difference measurement and gamma measurement of the sample of human skin, especially if the card 30 is used in tandem with a software application to produce an image of the sample 33 of human skin. The term "illuminance difference" relates to light hitting an image. Such light could come from uncontrollable angles, and thus the second potion 60 of each tile 56a allows for a software application to measure and interpret how the light falls onto a surface (i.e., the sample of human skin). The term "gamma" defines a relationship between a numerical value of a pixel and an actual luminance of the pixel. Such a relationship is further explained at: https://www.cambridgeincolour.com/tutorials/gamma-correction.htm.

Further detailed in FIG. 5A, the first set of tiles 56a is divided into four groups of such tiles 56a. Each group has a first tile 56a1, a second tile 56a2, a third tile 56a3, a fourth tile 56a4, and a fifth tile 56a5 that are positioned counter-clockwise along the respective edge 32 of the card 30, between two respective barcode regions 42. The HEX value of the second portion 60 of the tiles 56a decreases from CDCDCD to 000000 in a counterclockwise direction, from the first tile 56a1 to the fifth tile 56a5, and is unique for each tile 56a. For each group: the first tile 56a1 has a second portion 60 with a HEX value of CDCDCD. The second tile 56a2 has a second portion 60 with a HEX value of 9A9A9A. The third tile 56a3 has a second portion 60 with a HEX value of 666666. The fourth tile 56a4 has a second portion 60 with a HEX value of 333333. The fifth tile 56a5 has a second portion 60 with a HEX value of 000000.

As stated above, twenty tiles 56a are included to provide a border on the card. Each tile 56a has a first portion 58 that is white and a second portion 60 that is grey-scale, for measuring illuminance difference and gamma of an image of the sample of skin.

Second Set of Tiles

Figure 6:
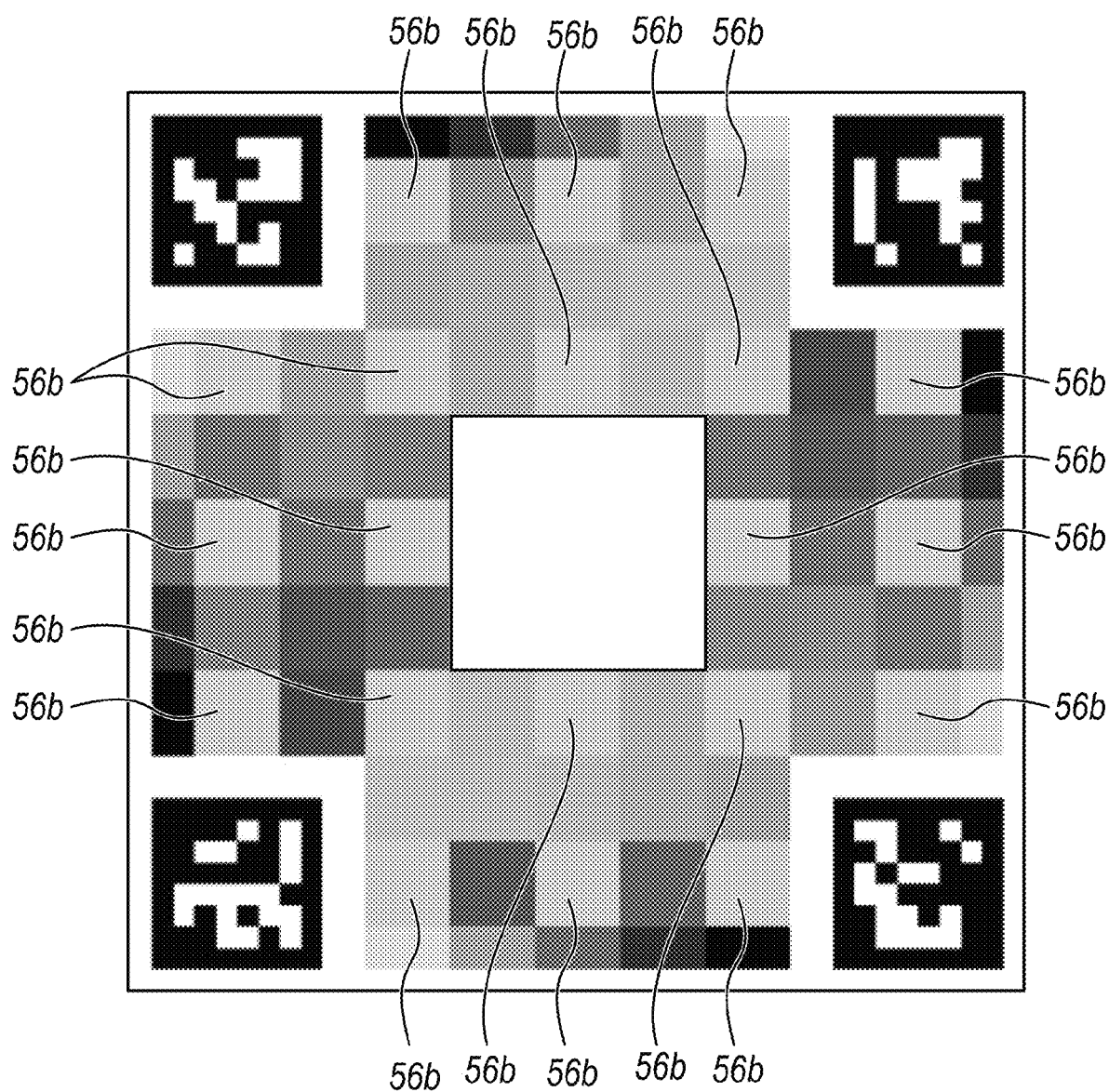
FIG. 6 highlights yet further various features of the card of FIG. 1A.

As indicated in FIG. 6, the plurality of tiles 56 also includes a second set of tiles 56b. The second set of tiles 56b includes twenty such tiles 56b. Each tile 56b has a HEX value representing a same shade of grey. In one version, the HEX value is BFBFBF. This HEX value allows for built-in image correction in settings where illumination may be uneven. This HEX value is least susceptible to being over-exposed or under-exposed because its digital representation fell in the middle of a signal range.

Figure 7:
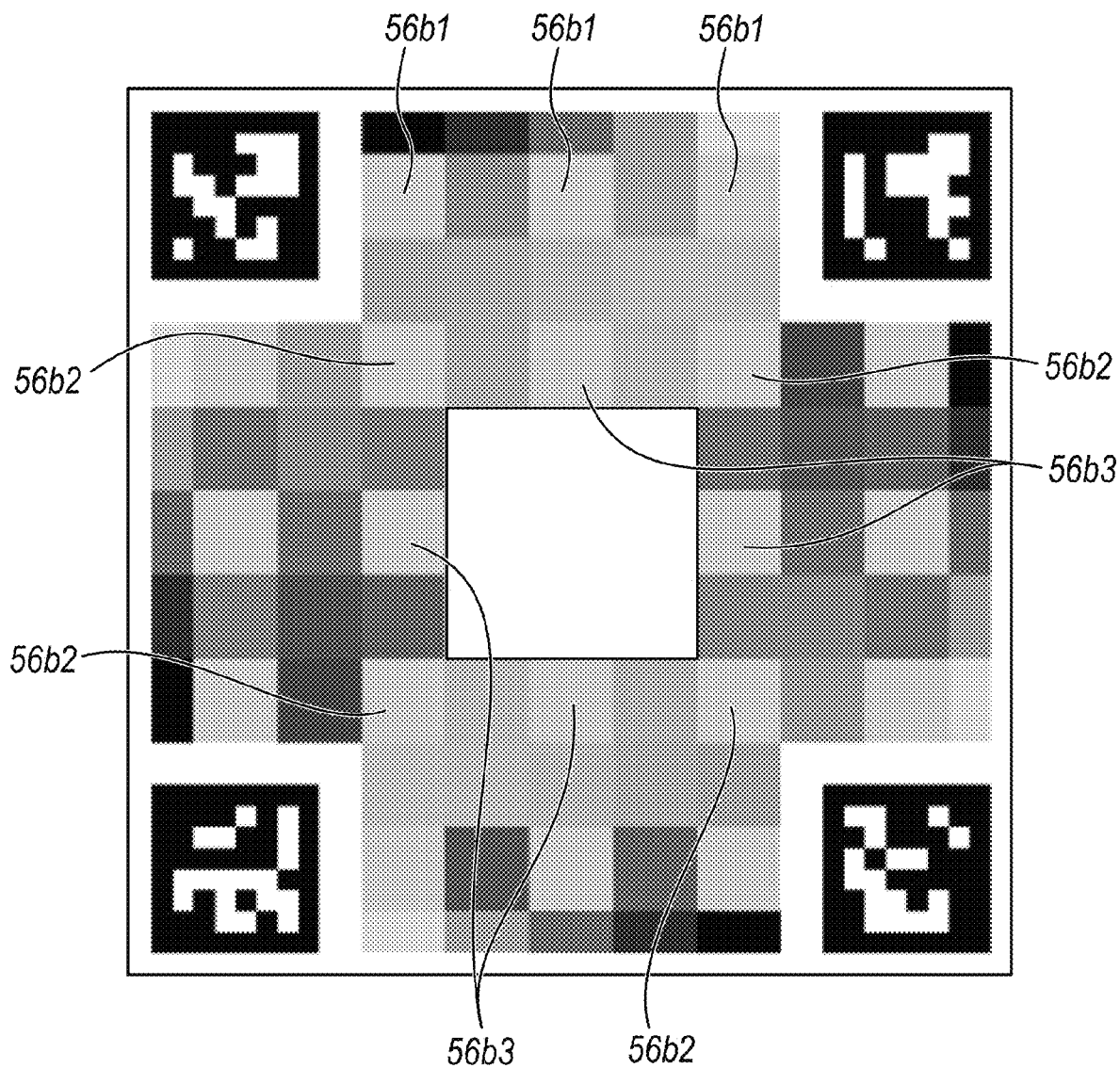
FIG. 7 highlights yet further various features of the card of FIG. 1A.

Detailed in FIG. 7, the second set of tiles 56b includes a first subset 56b1. The first subset 56b1 includes twelve such tiles 56b1 that are respectively adjacent to, and face the second portion 60 of, one of the first tile 56a1, the third tile 56a3, and the fifth tile 56a5 from a respective group of the first set of tiles 56a.

Also detailed in FIG. 7, the second set of tiles 56b also includes a second subset 56b2. The second subset 56b2 includes four such tiles 56b2 that are each positioned diagonally-adjacent between a respective corner 52 of the aperture 48 and a respective corner area 38.

Further detailed in FIG. 7, the second set of tiles 56b further includes a third subset 56b3. The third subset 56b3 includes four such tiles 56b3 that are each adjacent a respective edge 50 of the aperture 48, and aligned with the center point 40 of the aperture 48.

Four Zones

Figure 8:
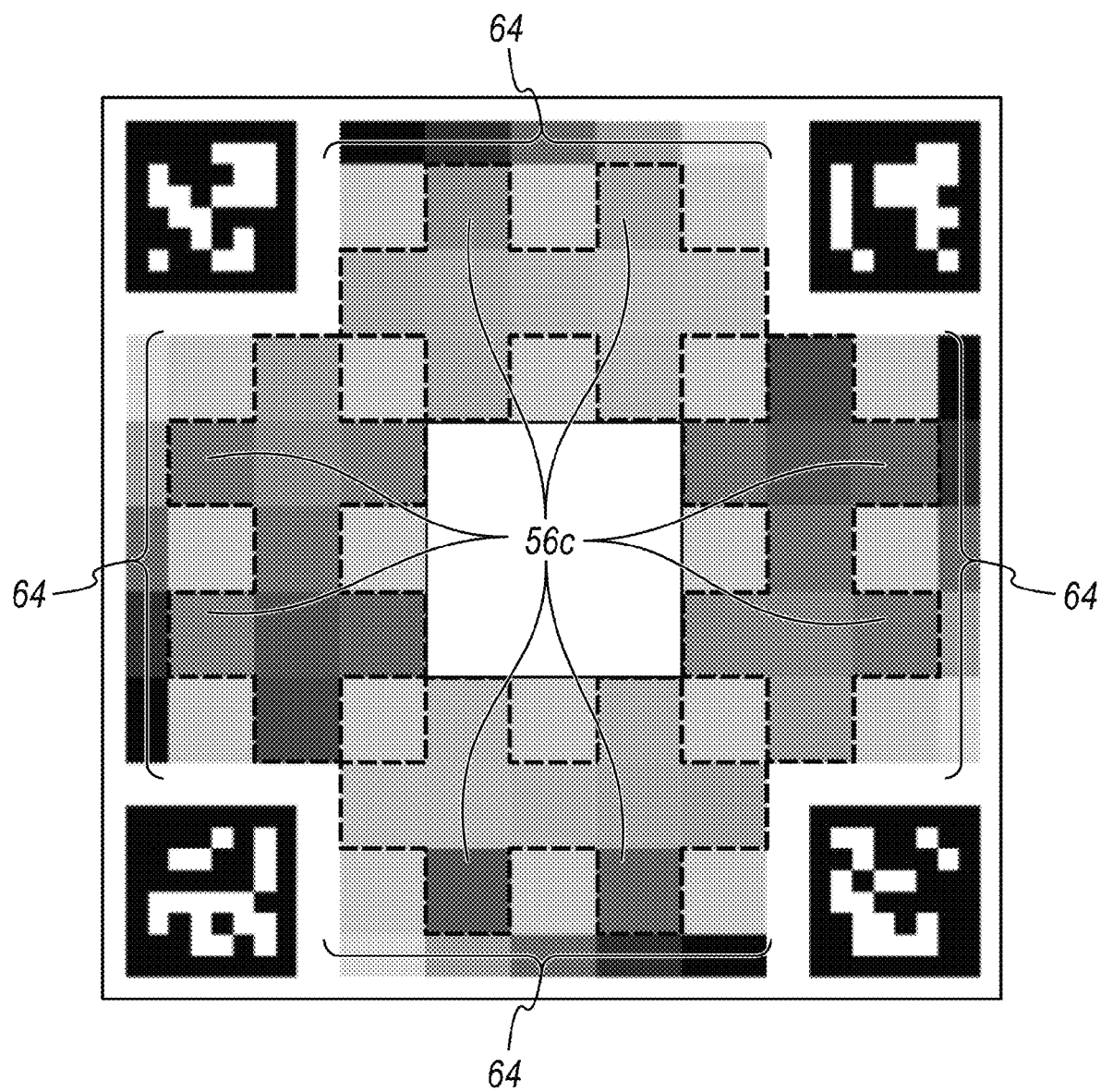
FIG. 8 highlights yet further various features of the card of FIG. 1A.

Referring to FIG. 8, the plurality of tiles 56 further includes a set of four zones 64. Each zone 64 is positioned among the first and second sets of tiles 56a, 56b for a respective edge 32 of the card 30. In one version, each zone 64 has a shape of a capital letter "H," with the horizontal line of the letter "H" extending off both vertical lines.

Color Tiles

Figure 9:
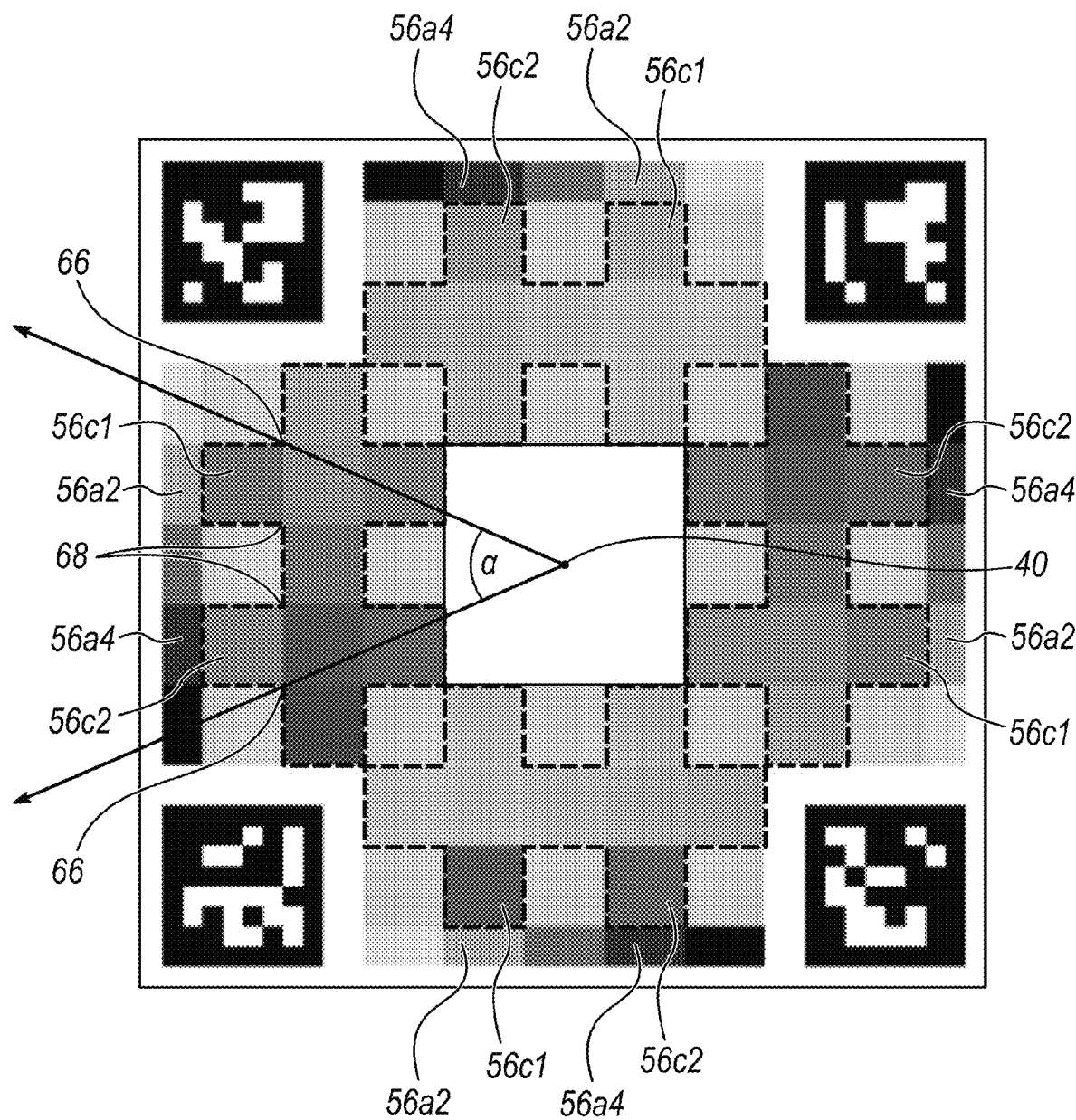
FIG. 9 highlights yet further various features of the card of FIG. 1A.

As detailed in FIGS. 8 and 9, each zone 64 has a pair of color tiles 56c, including a first color tile 56c1 and a second color tile 56c2. Thus, the card 30 has a total of eight color tiles 56c. This number was determined with respect to the number of both tiles in the second set of tiles 56b and skin-toned tiles 56d, which will be discussed further below. In each zone, both color tiles 56c1, 56c2 have a unique HEX value representing a color other than both (i) a shade of grey-scale and a (ii) HEX value corresponding to a tone of human skin. That is, the color tiles 56c have HEX values that are different from HEX values of the first set of tiles 56a, the second set of tiles 56b, and a plurality of skin-toned tiles 56d, detailed further below. The HEX values, being non-skin tone, provide a broad range of colors to the card 30 for built-in color correction. FIG. 9 indicates that the first color tile 56c1 and the second color tile 56c2 each also have an outer-inside corner 66 and an inner-inside corner 68, with respect to the center point 40 of the aperture 48. The first color tile 56c1 and the second color tile 56c2 are positioned non-adjacent to each other such that an angle α as measured between the outer-inside corner 66 of both color tiles 56c1, 56c2 and the center point 40 of the aperture 48 ranges, for instance, from 30° to 60°, or from 40° to 50°. In one version, the angle α is 45°. All versions described are envisioned. In the counterclockwise direction, the first color tile 56c1 is adjacent and facing the second portion 60 of the second tile 56a2, and the second color tile 56c2 is adjacent and facing the second portion 60 of the fourth tile 56a4, of a respective group of the first set of tiles 56a.

Figure 11:
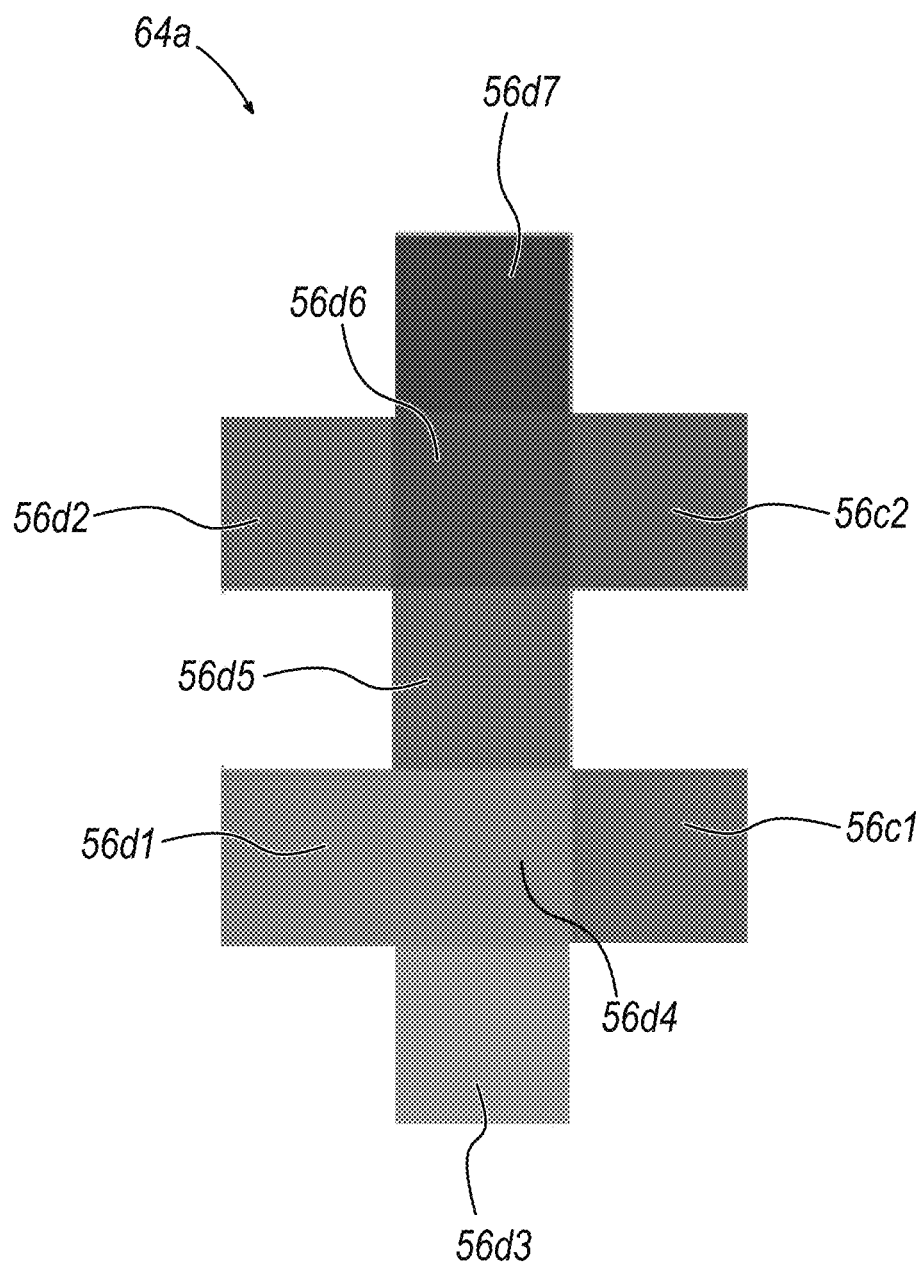
FIG. 11 illustrates a first of four zones of the card of FIG. 1A.
Figure 12:
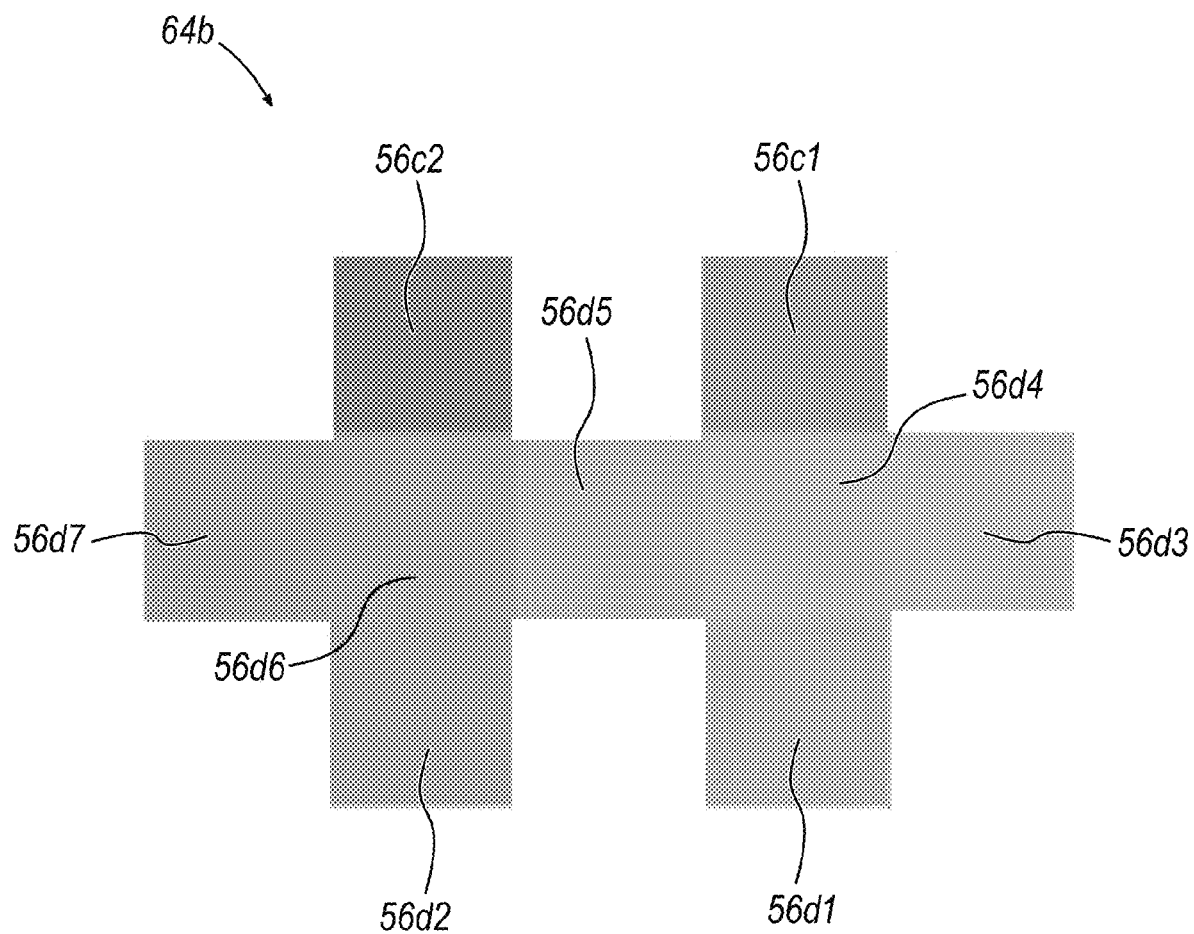
FIG. 12 illustrates a second of four zones of the card of FIG. 1A.
Figure 13:
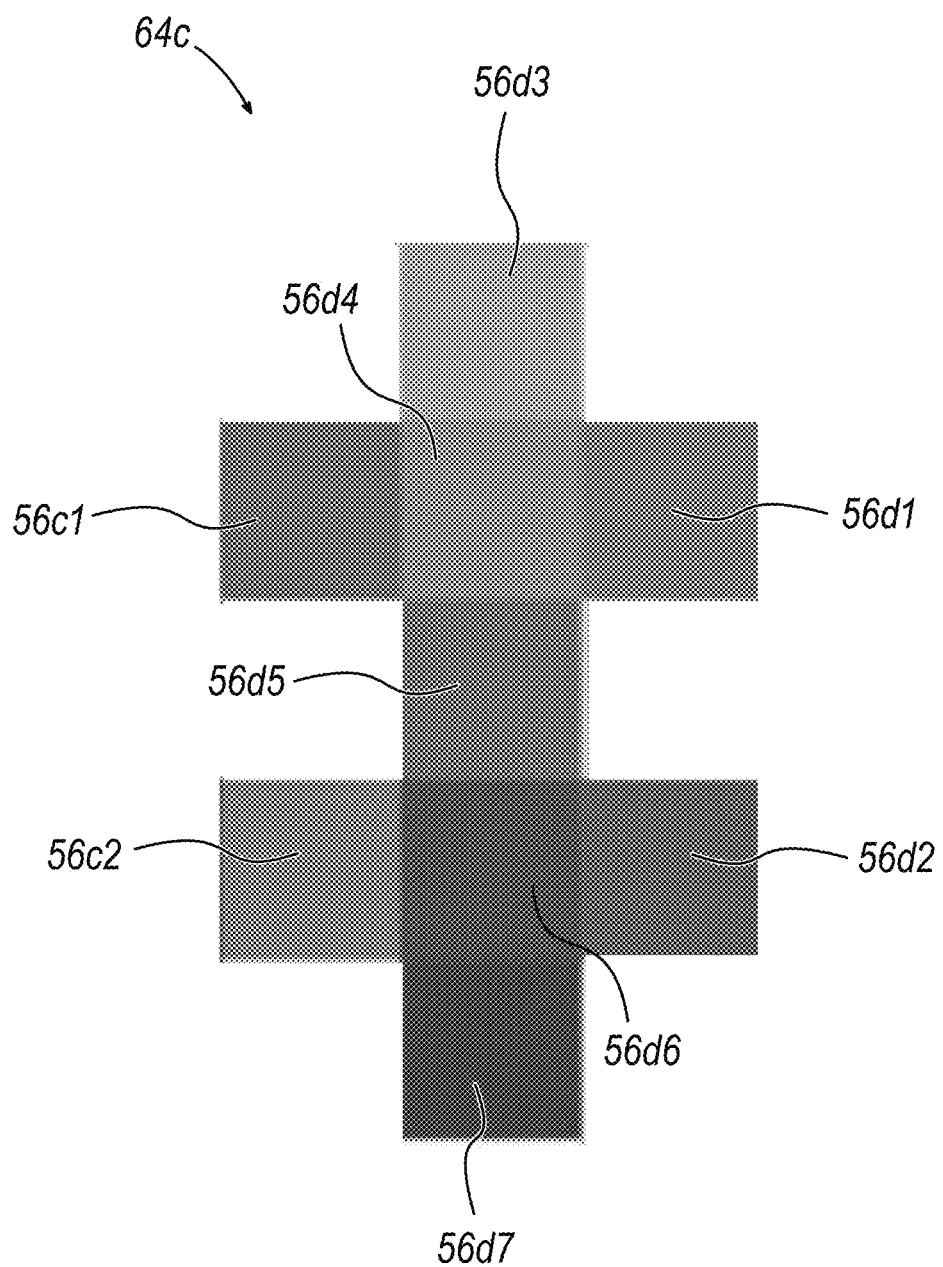
FIG. 13 illustrates a third of four zones of the card of FIG. 1A.
Figure 14:
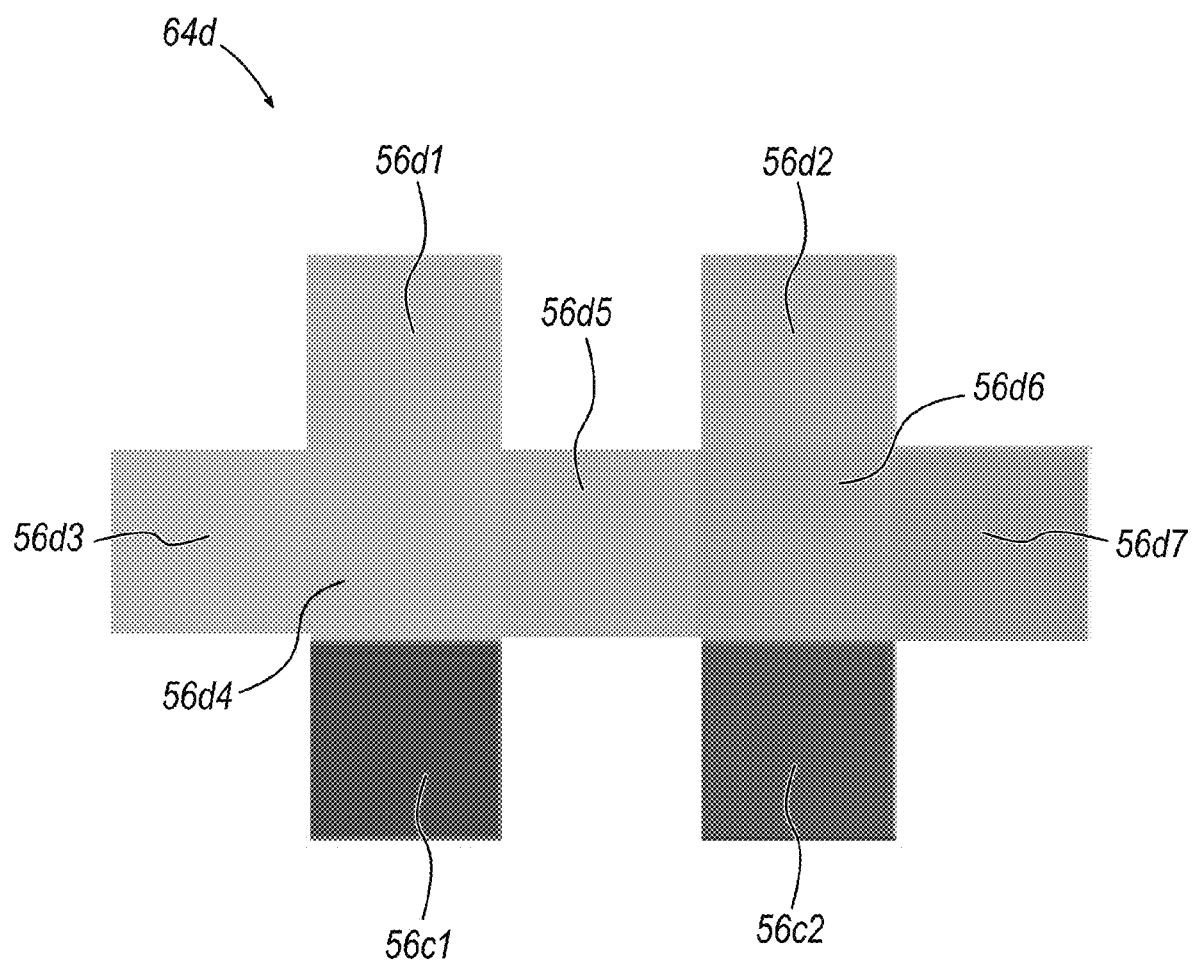
FIG. 14 illustrates a fourth of four zones of the card of FIG. 1A.

As illustrated in FIG. 11, in a first 64a of the four zones 64, the first color tile 56c1 has a HEX value of BF309B, and the second color tile 56c2 has a HEX value of BF3030. As illustrated in FIG. 12, in a second 64b of the four zones 64, the first color tile 56c1 has a HEX value of BF9B30, and the second color tile 56c2 has a HEX value of 78BF30. As illustrated in FIG. 13, in a third 64c of the four zones 64, the first color tile 56c1 has a HEX value of 30BF54, and the second color tile 56c2 has a HEX value of 30BFBF. As illustrated in FIG. 14, in a fourth 64d of the four zones 64, the first color tile 56c1 has a HEX value of 3054BF, and the second color tile 56c2 has a HEX value of 7830BF.

Eight tiles 56c, each having a unique HEX value representing a color other than both (i) a shade of grey-scale and a (ii) HEX value corresponding to a tone of human skin (i.e. colors in the HSV color space) are included and spaced to provide a broad range of colors for aiding in color correction. The positioning of these tiles 56c (i.e., the angle α as measured between the outer-inside corner 66 of both color tiles 56c1, 56c2 in each zone 64 and the center point 40 of the aperture 48) is determined by the space available on the card 30, as well as the fact that the HSV color space is defined as a color wheel measuring from 0° to 360° to represent a full color spectrum. Since there are eight tiles 56c, 360° divided by 8 is 45° for the angle α.

Skin-Toned Tiles

Figure 10:
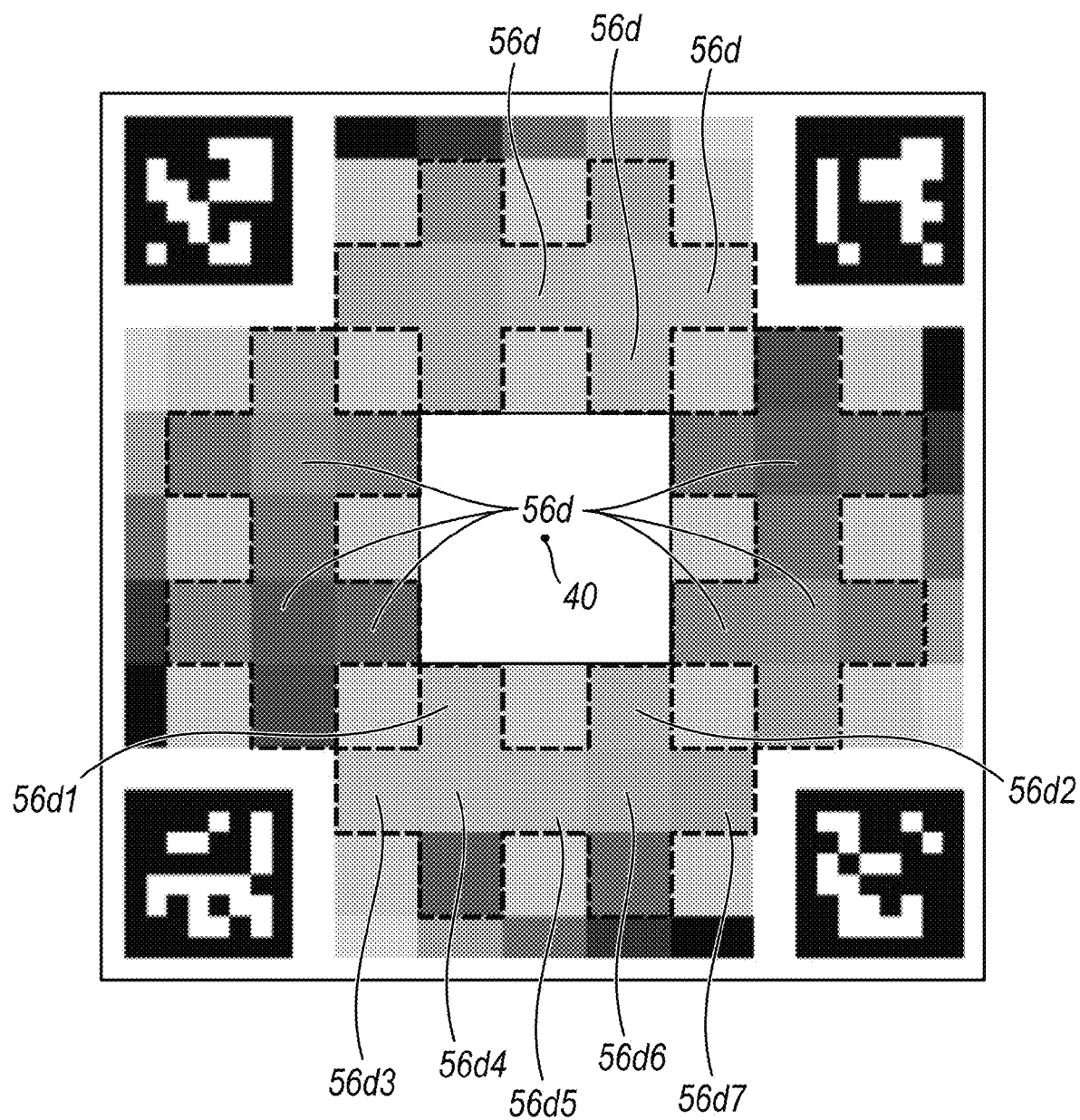
FIG. 10 highlights yet further various features of the card of FIG. 1A.

Each zone 64 also includes a plurality of skin-toned tiles 56d, representatives of which are indicated in FIG. 10. Each skin-toned tile 56d has a HEX value representing a tone of human skin. In one version, each zone 64 includes seven skin-toned tiles 56d. Thus, the card 30 has a total of 28 skin-toned tiles 56d. In another version, each HEX value is unique.

Also indicated in FIGS. 10-14, in each zone 64, a first 56d1 of the skin-toned tiles 56d is adjacent the aperture 48, between a respective tile of the second subset 56b2 and the third subset 56b3 of the second set of tiles 56b and aligned with the first color tile 56c1. A second 56d2 of the skin-toned tiles 56d is adjacent the aperture 48, between a respective tile of the second subset 56b2 and the third subset 56b3 of the second set of tiles 56b and aligned with the second color tile 56c2. A third 56d3 of the skin-toned tiles 56d is positioned between a respective tile of the first subset 56b1 and the second subset 56b2 of the second set of tiles 56b, aligned with the first tile 56a1 of the first set of tiles 56a, adjacent a respective corner area 38, and diagonally-adjacent to the outer-inside corner 66 of the first color tile 56c1. A fourth 56d4 of the skin-toned tiles 56d is positioned between the first 56d1 of the skin-toned tiles 56d and the first color tile 56c1. A fifth 56d5 of the skin-toned tiles 56d is positioned between a respective tile of the first subset 56b1 and the third subset 56b3 of the second set of tiles 56b, aligned with the third tile 56a3 of the first set of tiles 56a, and diagonally-adjacent to the inner-inside corner 68 of both the first color tile 56c1 and the second color tile 56c2. A sixth 56d6 of the skin-toned tiles 56d is positioned between the second 56d2 of the skin-toned tiles 56d and the second color tile 56c2. A seventh 56d7 of the skin-toned tiles 56d is positioned between a respective tile of the first subset 56b1 and the second subset 56b2 of the second set of tiles 56b, aligned with the fifth tile 56a5 of the first set of tiles 56a, adjacent a respective corner area 38, and diagonally-adjacent to the outer-inside corner 66 of the second color tile 56c2.

The HEX value from one skin-toned tile 56d to a next skin-toned tile 56d (i.e., between adjacent skin-toned tiles 56d), in the counterclockwise direction, represents an increase in amount of pigmentation of human skin. Referring again to FIG. 11, in the first 64a of the four zones 64: the first 56d1 of the skin-toned tiles 56d has a HEX value of A0765A. The second 56d2 of the skin-toned tiles 56d has a HEX value of 876249. The third 56d3 of the skin-toned tiles 56d has a HEX value of AA8B6D. The fourth 56d4 of the skin-toned tiles 56d has a HEX value of 99795D. The fifth 56d5 of the skin-toned tiles 56d has a HEX value of 846349. The sixth 56d6 of the skin-toned tiles 56d has a HEX value of 654D3E. The seventh 56d7 of the skin-toned tiles 56d has a HEX value of 544338.

Referring again to FIG. 12, in the second 64b of the four zones 64: the first 56d1 of the skin-toned tiles 56d has a HEX value of C3A38F. The second 56d2 of the skin-toned tiles 56d has a HEX value of BB9983. The third 56d3 of the skin-toned tiles 56d has a HEX value of C8AC99. The fourth 56d4 of the skin-toned tiles 56d has a HEX value of C7A896. The fifth 56d5 of the skin-toned tiles 56d has a HEX value of C6A098. The sixth 56d6 of the skin-toned tiles 56d has a HEX value of C1958C. The seventh 56d7 of the skin-toned tiles 56d has a HEX value of BE9186.

Referring again to FIG. 13, in the third 64c of the four zones 64: the first 56d1 of the skin-toned tiles 56d has a HEX value of 976C52. The second 56d2 of the skin-toned tiles 56d has a HEX value of 775642. The third 56d3 of the skin-toned tiles 56d has a HEX value of B58678. The fourth 56d4 of the skin-toned tiles 56d has a HEX value of A57461. The fifth 56d5 of the skin-toned tiles 56d has a HEX value of 895F4D. The sixth 56d6 of the skin-toned tiles 56d has a HEX value of 63483E. The seventh 56d7 of the skin-toned tiles 56d has a HEX value of 544239.

Referring again to FIG. 14, in the fourth 64d of the four zones 64: the first 56d1 of the skin-toned tiles 56d has a HEX value of C5A691. The second 56d2 of the skin-toned tiles 56d has a HEX value of BE9D86. The third 56d3 of the skin-toned tiles 56d has a HEX value of C9AD95. The fourth 56d4 of the skin-toned tiles 56d has a HEX value of C5A991. The fifth 56d5 of the skin-toned tiles 56d has a HEX value of C0A48D. The sixth 56d6 of the skin-toned tiles 56d has a HEX value of B89A7E. The seventh 56d7 of the skin-toned tiles 56d has a HEX value of B19175.

As shown, the card 30 includes 28 tiles 56d, each having a unique HEX value representing a skin tone. Specific HEX values from the Pantone® SkinTone™ Guide provide an even range from light pigmentation to heavy pigmentation, as well as an even range from cool tones to warm tones. Twenty tiles 56b having a same shade of grey (i.e., neutral grey) provide built-in image correction for situations where uneven illumination may occur. As described above, neutral grey (i.e., HEX value of BFBFBF) is least susceptible to being over-exposed or under-exposed, since its digital representation falls in the middle of a signal range.

Eight tiles 56c, each having a unique HEX value representing a color different from either (i) a shade of grey-scale, or (ii) a HEX value corresponding to a tone of human skin (i.e., colors in the HSV color space). The tiles 56c provide a broad range of colors to aid in color correction. The positioning of these tiles 56c (i.e., the angle (α)) as measured between outer-inside corner 66 of both color tiles 56c1, 56c2 in each zone 64 and the center point 40 is chosen space available on the card 30, as well as the fact that the HSV color space is defined as a color wheel measuring from 0° to 360° to represent a full color spectrum. In the version shown, since there are eight tiles 56c, 360° divided by 8 is 45° for the angle α. Twenty tiles 56a are included to provide a border on the card 30, each having a first portion 58 that is white and a second portion 60 that is grey-scale, for measuring illuminance difference and gamma of an image of the sample of human skin.

II. Second Example of a Card

Figure 15:
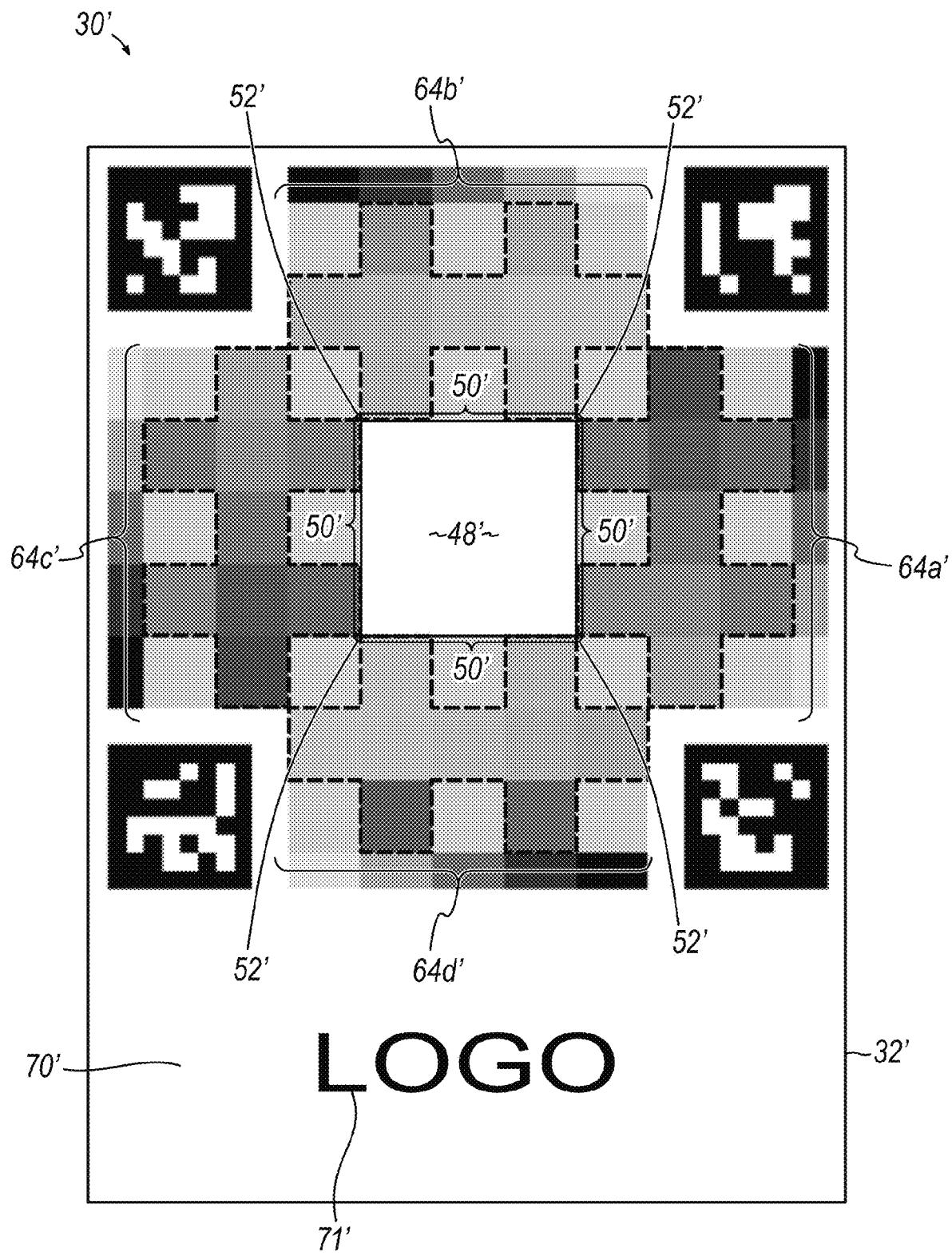
FIG. 15 illustrates an example of a card for identifying a tone of a sample of human skin.

Referring now to FIG. 15, in an embodiment, a card 30' includes an extension 70' for allowing a user to hold the card 30' without interfering with a plurality of tiles 56'. In one version, the extension 70' is positioned between a fourth zone 64d' and an edge 32' of the card 30' below the fourth zone 64d'. The extension 70' may measure from 15 mm to 20 mm in length, for instance 17 mm in length. All dimensions are envisioned. The extension 70' may include a logo 71' or other marking. In other versions, the card 30' may be without the extension 70'. All other prime (') reference numerals correspond to their original counterparts previously described herein.

Tiles Surrounding Aperture

Figure 16:
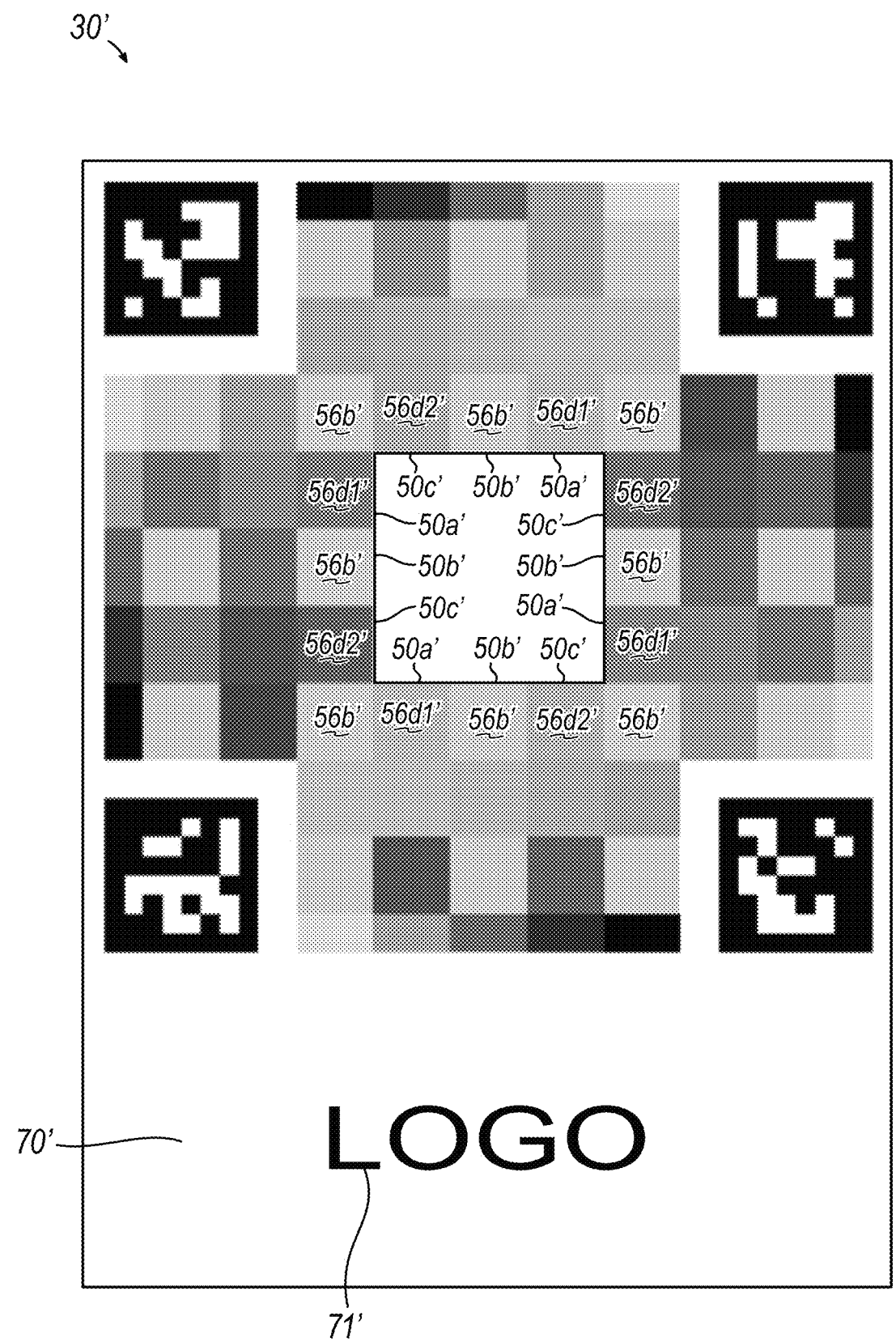
FIG. 16 highlights various features of the card of FIG. 15.

As detailed between FIGS. 15 and 16, each corner 52' of an aperture 48' is diagonally-adjacent a tile 56b' having a HEX value of BFBFBF. In a counterclockwise direction, each edge 50' of the aperture 48' has a first portion 50a', a second portion 50b', and a third portion 50c'. In one version, the first portion 50a', the second portion 50b', and the third portion 50c' are each a third of a length of the edge 50'. The first portion 50a' is adjacent a respective first skin-toned tile 56d1'. The second portion 50b' is adjacent a tile 56b' having a HEX value of BFBFBF. The third portion 50c' is adjacent a respective second skin-toned tile 56d2'.

With respect to a first zone 64a', the first portion 50a' of the edge 50' is adjacent the first skin-toned tile 56d1', with a HEX value of A0765A. The third portion 50c' of the edge 50' is adjacent the second skin-toned tile 56d2', with a HEX value of 876249.

With respect to a second zone 64b', the first portion 50a' of the edge 50' is adjacent the first skin-toned tile 56d1', with a HEX value of C3A38F. The third portion 50c' of the edge 50' is adjacent the second skin-toned tile 56d2', with a HEX value of BB9983.

With respect to a third zone 64c', the first portion 50a' of the edge 50' is adjacent the first skin-toned tile 56d1', with a HEX value of 976C52. The third portion 50c' of the edge 50' is adjacent the second skin-toned tile 56d2', with a HEX value of 775642.

With respect to a fourth zone 64d', the first portion 50a' of the edge 50' is adjacent the first skin-toned tile 56d1', with a HEX value of C5A691. The third portion 50c' of the edge 50' is adjacent the second skin-toned tile 56d2', with a HEX value of BE9D86.

Use of the Card with a Software Application

The card 30, 30' can be used in tandem with a software application, such as on a mobile phone (i.e., a mobile phone app). A user may, for instance, place the card 30, 30' over their skin and take a picture with the mobile phone app, which would then analyze the picture as a sample of the skin. A proper tone can be determined for the skin of that particular user, and products can be recommended for skincare.

Figure 17:
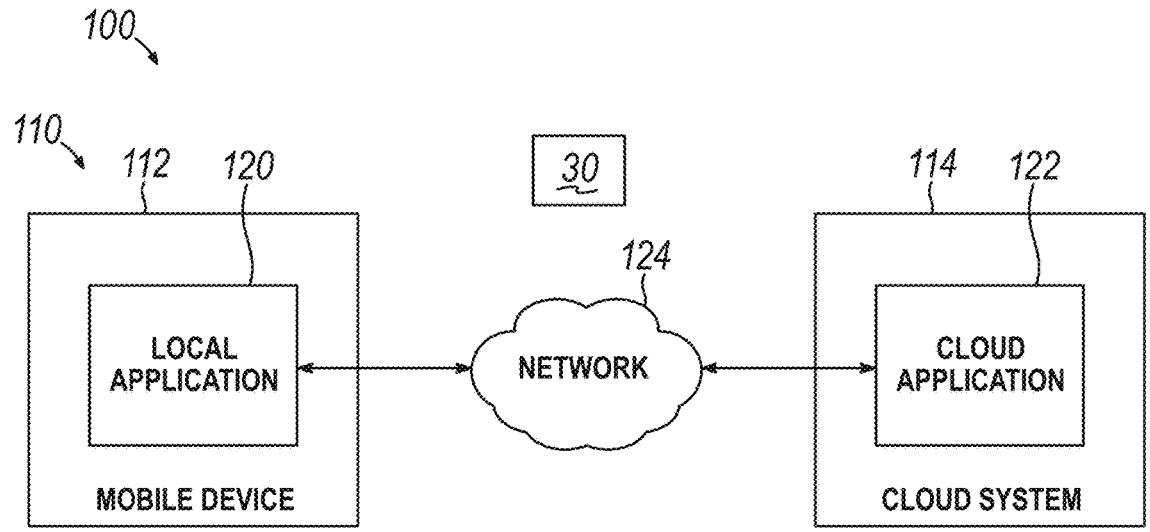
FIG. 17 illustrates an example of a diagrammatic view of a system for identifying skin tone, including the card of FIG. 1A.
Figure 18:
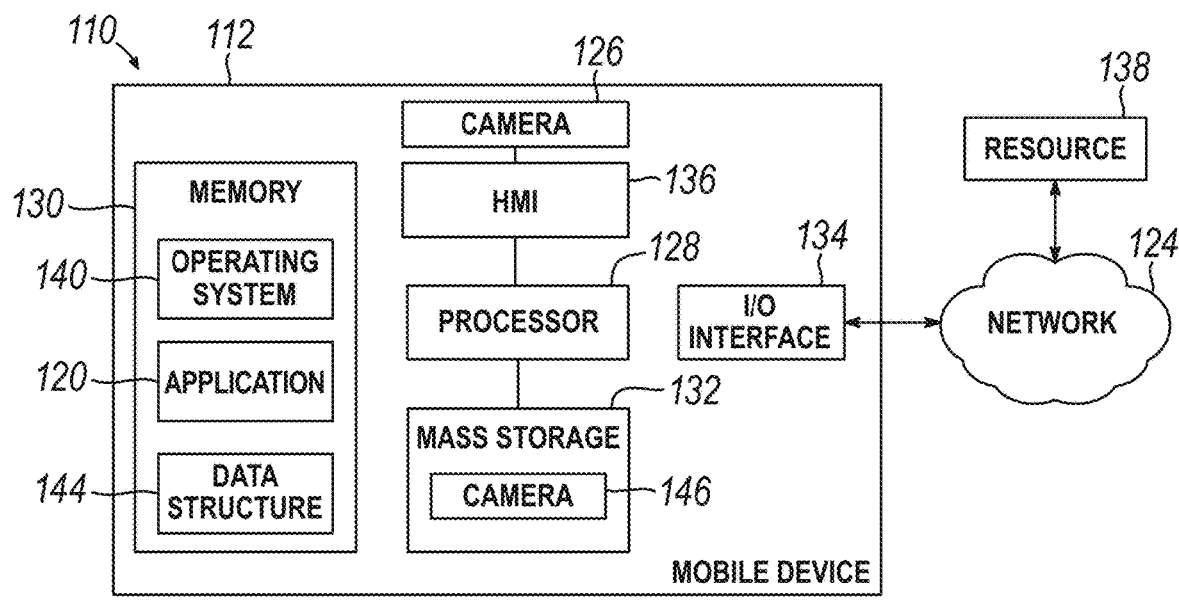
FIG. 18 illustrates an example of a diagrammatic view of an example of a database system of the system of FIG. 17.

FIG. 17 shows a diagrammatic view of an exemplary system 100 for identifying skin tone, and FIG. 18 shows a diagrammatic view of an exemplary database setup of the system 100 of FIG. 17. Referring now to FIG. 17, system 100 may include an operating environment 110 for processing data received by the system 100. In general, the system 100 operates to capture, process, and identify a tone of a sample of human skin. The system 100 includes at least one card 30, 30' and a user system for allowing a user to interface the card 30, 30' with the operating environment 110. While the user system is shown and described as a mobile device 112, other suitable user systems are also envisioned including a computer system. As used herein, a "mobile device" is a portable electronic device that includes a camera and may connect to the internet, and is expressly intended to include smartphones (e.g., iPhones) and tablet computers (e.g., iPods and iPads) from various manufacturers and of different shapes and sizes, as well as other portable electronic devices that include a camera and may connect to the internet. The mobile device 112 includes a local application 120 for interacting with the card 30, 30'. In some versions, the system 100 may include a cloud-based application 122 existing in a cloud system 114 for interacting with the local application 120. In some versions, a network 124 may connect the local application 120 with the cloud-based application 122.

Referring now to FIG. 18, the mobile device 112, the cloud system 114, and the network 124 of the operating environment 110 may be implemented on one or more computing devices or systems. Aspects of the system 100 may be compatible with web applications and desktop applications. The mobile device 112 may include a local application 120, a camera 126, a processor 128, a memory 130, a mass storage memory device 132, an input/output (I/O) interface 134, and a Human Machine Interface (HMI) 136. The mobile device 112 may be coupled to one or more external resources 138 via the network 124 or the I/O interface 134. The external resource 138 may include, but is not limited to, servers, databases, mass storage devices, peripheral devices, cloud-based network services, scanners, or any other computer resource that may be used by the mobile device 112.

The processor 128 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 130. The memory 130 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 132 may include data storage devices such as a hard drive, optical drive, tape drive, non-volatile solid-state device, or any other device capable of storing information. The processor 128 may operate under the control of an operating system 140 that resides in the memory 130. The operating system 140 may manage computer resources so that computer program code embodied as one or more computer software applications, such as the local application 120 residing in the memory 130, may have instructions executed by the processor 128. In an alternative embodiment, the processor 128 may execute the local application 120 directly, in which case, the operating system 140 may be omitted. One or more data structures 144 may also reside in the memory 130, and may be used by the processor 128, the operating system 140, or the local application 120 to store or manipulate data.

The I/O interface 134 may provide a machine interface that allows for co-operation between the processor 128 and other devices and systems, such as the network 124 or the external resource 138. The processor 128 and other devices/systems may be directly coupled to each other, or indirectly coupled. In either case, they operate together. The local application 120 may thereby work with the network 124 or the external resource 138 by communicating via the I/O interface 134 to provide the various features, functions, applications, processes, or modules comprising embodiments of the invention. The local application 120 may also have program code that is executed by one or more external resources 138, or otherwise rely on functions or signals provided by other system or network components external to the mobile device 112. Indeed, given the nearly endless hardware and software combinations possible, persons having ordinary skill in the art will understand that embodiments of the invention may include applications that are located externally to the mobile device 112, distributed among multiple computers or other external resources 138, or provided by computing resources (hardware and software) that are provided as a service over the network 124, such as a cloud computing service (e.g., the cloud system 114 that includes the cloud application 122).

The HMI 136 may co-operate with the processor 128 of the mobile device 112 so as to allow a user to interact directly with the mobile device 112. The HMI 136 may be directly or indirectly coupled to the processor 128. The HMI 136 may include video or alphanumeric displays, a touch screen, a speaker, and any other audio and visual indicators for providing data to the user. The HMI 136 may also include input devices and controls such as an alphanumeric keyboard, a pointing device, keypads, pushbuttons, control knobs, microphones, etc., capable of accepting commands or input from the user and transmitting the entered input to the processor 128.

A database 146 may reside on the mass storage memory device 132, and may be used to collect and organize data used by the various systems and modules described herein. The database 146 may include data and supporting data structures 144 that store and organize the data. In particular, the database 146 may be arranged with any database organization or structure including, but not limited to, a relational database, a hierarchical database, a network database, or combinations thereof. A database management system in the form of a computer software application executing as instructions on the processor 128 may be used to access the information or data stored in records of the database 146 in response to a query, where a query may be dynamically determined and executed by the operating system 140, other the local applications 120, or one or more modules.

Method of Use

Figure 19:
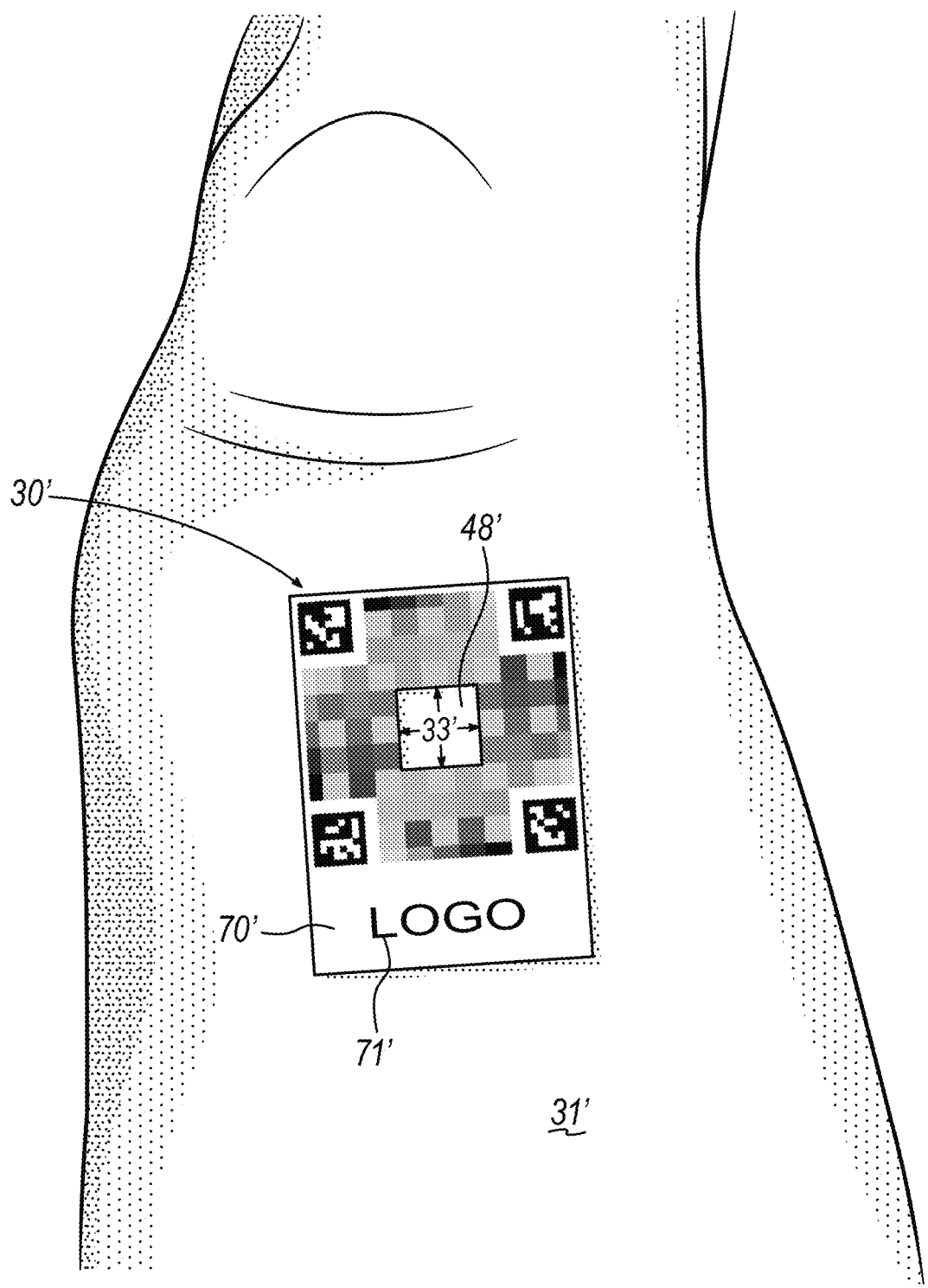
FIG. 19 illustrates an example of the card of FIG. 15 placed over a human body part.
Figure 20:
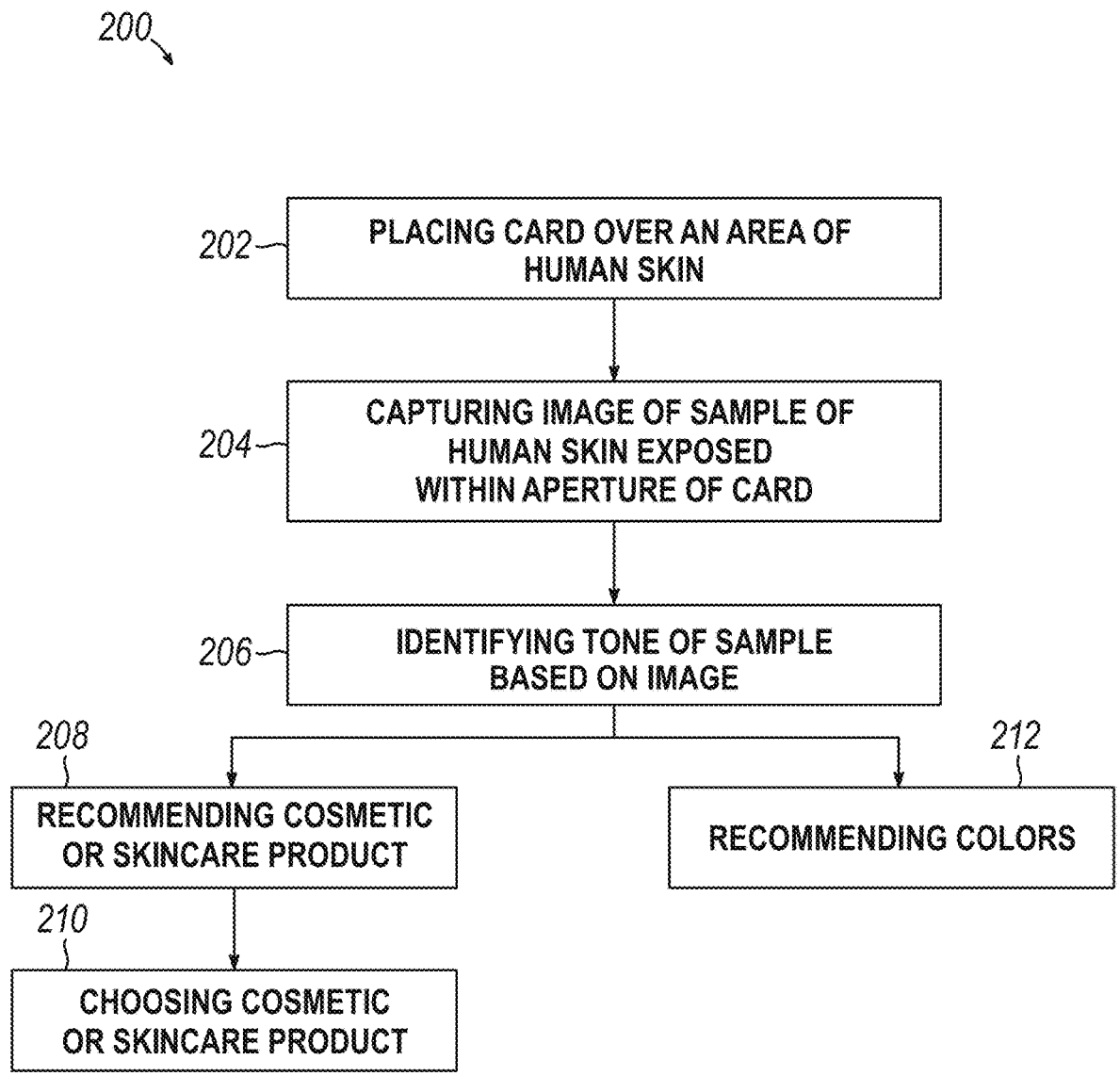
FIG. 20 illustrates an example of a flowchart of a method of identifying a tone of a sample of human skin using the card of FIG. 1A or 15.

A non-limiting method 200 of using the card 30, 30' to identify a tone of a sample of human skin is now described. As illustrated in FIG. 19, a first step is placing 202 the card 30, 30' over a human body part 31, 31' (for instance, a leg) to expose a sample 33, 33' of human skin within the aperture 48, 48' of the card 30, 30'. The human body part 31, 31' could also be, for instance, an arm, a back, or a pelvic area. A second step is capturing 204 an image of the sample 33, 33' by using a mobile device 112 (for instance, by using a camera of a mobile device 112). The entire card 30, 30' should be captured in the image as well. A third step is identifying 206 the tone of the sample 33, 33' based on the image. For example, the image may be loaded into the local application 120 and/or communicated to the cloud application 122 using the network 124, as described above. From there, additional steps of the method 200 may include, for instance, recommending 208 and choosing 210 a cosmetic or skincare product, or recommending colors 212 (for instance, for a background or item of clothing) to combine with the tone of the sample 33, 33'. The method 200 is depicted in FIG. 20.

Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A card for identifying a tone of a sample of human skin, said card comprising: (a) an aperture for allowing the sample of human skin to be viewed therethrough, said aperture centered at a center point; (b) a plurality of barcode regions for identifying said card as unique from another such card and for identifying a layout and orientation of said card; and (c) a plurality of tiles, surrounding said aperture, for providing a comparison and contrast against the sample of human skin; wherein said plurality of tiles comprises: (i) a first set of tiles, each having a HEX value representing a shade of grey-scale, (ii) a second set of tiles, each having a HEX value representing a same shade of grey; (iii) a plurality of skin-toned tiles each having a HEX value representing a tone of human skin, and (iv) a plurality of color tiles arranged in a set of four zones, each zone positioned among said first set and said second set of tiles; wherein each zone comprises a first color tile and a second color tile, each having a HEX value representing a color different from any of (i) said first set of tiles, (ii) said second set of tiles, and (iii) said plurality of skin-toned tiles; wherein: said first color tile and said second color tile each have an outer-inside corner; said first color tile and said second color tile are positioned non-adjacent to each other such that an angle as measured between said outer-inside corner of both color tiles and said center point of said aperture ranges from 30° to 60°.

Example 2

Said card of Example 1, wherein said aperture is from 4 to 10 times larger in area than each of said plurality of tiles.

Example 3

Said card of any of Examples 1 through 2, wherein said aperture has a shape of a square having four edges and four corners.

Example 4

Said card of any of Examples 1 through 3, wherein each barcode region is spaced diagonally from said aperture along a pair of perpendicular diagonal axes.

Example 5

Said card of any of Examples 1 through 4, wherein each barcode region has an ArUco barcode.

Example 6

Said card of any of Examples 1 through 5, wherein said first color tile and said second color tile are positioned non-adjacent to each other such that said angle is 45°.

Example 7

Said card of any of Examples 1 through 6, wherein: said first set of tiles has twenty such tiles arranged into four groups of such tiles adjacent to a respective edge of said card, between two respective barcode regions; each group has a first tile, a second tile, a third tile, a fourth tile, and a fifth tile; and said first portion of each such tile faces said respective edge of said card, and said second portion of each such tile faces towards said aperture.

Example 8

Said card of any of Examples 1 through 7, wherein said first set of tiles has a HEX value of grey-scale that decreases from CDCDCD to 000000 in a counterclockwise direction, from said first tile to said fifth tile.

Example 9

Said card of any of Examples 1 through 8, wherein for each group of said first set of tiles: said first tile has a second portion with a HEX value of CDCDCD; said second tile has a second portion with a HEX value of 9A9A9A; said third tile has a second portion with a HEX value of 666666; said fourth tile has a second portion with a HEX value of 333333; and said fifth tile has a second portion with a HEX value of 000000.

Example 10

Said card of any of Examples 1 through 9, wherein: said second set of tiles has twenty such tiles, each with a HEX value of BFBFBF; a first subset of said second set of tiles includes twelve such tiles that are respectively adjacent to, and facing said second portion of, one of said first tile, said third tile, and said fifth tile from a respective group of said first set of tiles; a second subset of said second set of tiles includes four such tiles that are each positioned diagonally-adjacent between a respective corner of said aperture and a respective corner area; and a third subset of said second set of tiles includes four such tiles that are each adjacent a respective edge of said aperture, aligned with said center point of said aperture.

Example 11

Said card of any of Examples 1 through 10, wherein, in the counterclockwise direction, said first color tile is adjacent and facing said second portion of said second tile, and said second color tile is adjacent and facing said second portion of said fourth tile, of a respective group of said first set of tiles.

Example 12

Said card of any of Examples 1 through 11, wherein each of said plurality of color tiles has a unique HEX value.

Example 13

Said card of any of Examples 1 through 12, wherein, in the counterclockwise direction: in a first zone of said set of four zones, said first color tile has a HEX value of BF309B, and said second color tile has a HEX value of BF3030; in a second zone of said set of four zones, said first color tile has a HEX value of BF9B30, and said second color tile has a HEX value of 78BF30; in a third zone of said set of four zones, the first color tile has a HEX value of 30BF54, and said second color tile has a HEX value of 30BFBF; and in a fourth zone of said set of four zones, said first color tile has a HEX value of 3054BF, and said second color tile has a HEX value of 7830BF.

Example 14

Said card of any of Examples 1 through 13, wherein for each of said set of four zones, said plurality of skin-toned tiles includes seven tiles.

Example 15

Said card of any of Examples 1 through 14, wherein for each of said set of four zones: a first tile of said skin-toned tiles is adjacent said aperture, between a respective tile of said second subset and said third subset of said second set of tiles, and aligned with said first color tile; a second tile of said skin-toned tiles is adjacent said aperture, between a respective tile of said second subset and said third subset of said second set of tiles, and aligned with said second color tile; a third tile of said skin-toned tiles is positioned between a respective tile of said first subset and said second subset of said second set of tiles, aligned with said first tile of said first set of tiles, adjacent a respective corner area, and diagonally-adjacent said outer-inside corner of said first color tile; a fourth tile of said skin-toned tiles is positioned between said first skin-toned tile and said first color tile; a fifth tile of said skin-toned tiles is positioned between a respective tile of said first subset and said third subset of said second set of tiles, aligned with said third tile of said first set of tiles, and diagonally-adjacent the inner-inside corner of both said first color tile and said second color tile; a sixth tile of said skin-toned tiles is positioned between said second skin-toned tile and said second color tile; a seventh tile of said skin-toned tiles is positioned between a respective tile of said first subset and said second subset of said second set of tiles, aligned with said fifth tile of said first set of tiles, adjacent a respective corner area, and diagonally-adjacent said outer-inside corner of said second color tile; and said HEX value between adjacent skin-toned tiles, in the counterclockwise direction, represents an increase in amount of pigmentation of the human skin.

Example 16

Said card of any of Examples 1 through 15, wherein: in said first of said set of four zones, said first of said skin-toned tiles has a HEX value of A0765A, said second of said skin-toned tiles has a HEX value of 876249, said third of said skin-toned tiles has a HEX value of AA8B6D, said fourth of said skin-toned tiles has a HEX value of 99795D, said fifth of said skin-toned tiles has a HEX value of 846349, said sixth of said skin-toned tiles has a HEX value of 654D3E, and said seventh of said skin-toned tiles has a HEX value of 544338; in said second of said set of four zones, said first of said skin-toned tiles has a HEX value of C3A38F, said second of said skin-toned tiles has a HEX value of BB9983, said third of said skin-toned tiles has a HEX value of C8AC99, said fourth of said skin-toned tiles has a HEX value of C7A896, said fifth of said skin-toned tiles has a HEX value of C6A098, said sixth of said skin-toned tiles has a HEX value of C1958C, and said seventh of said skin-toned tiles has a HEX value of BE9186; in said third of said set of four zones, said first of said skin-toned tiles has a HEX value of 976C52, said second of said skin-toned tiles has a HEX value of 775642, said third of said skin-toned tiles has a HEX value of B58678, said fourth of said skin-toned tiles has a HEX value of A57461, said fifth of said skin-toned tiles has a HEX value of 895F4D, said sixth of said skin-toned tiles has a HEX value of 63483E, and said seventh of said skin-toned tiles has a HEX value of 544239; and in said fourth of said set of four zones, said first of said skin-toned tiles has a HEX value of C5A691, said second of said skin-toned tiles has a HEX value of BE9D86, said third of said skin-toned tiles has a HEX value of C9AD95, said fourth of said skin-toned tiles has a HEX value of C5A991, said fifth of said skin-toned tiles has a HEX value of C0A48D, said sixth of said skin-toned tiles has a HEX value of B89A7E, and said seventh of said skin-toned tiles has a HEX value of B19175.

Example 17

A card, for identifying a tone of a sample of human skin, comprising: said card having a shape of a square with four edges, four corners, an area, and four corner areas positioned at a respective corner; wherein each of said corner areas is a portion of said area, positioned at a respective corner, and are all of a same size; a group of four barcode regions, for identifying said card as unique from another such card, and for identifying a layout and orientation of said card; an aperture, for placement over the sample of human skin, centered around a center point; wherein said aperture has a shape of a square, four edges, and four corners; a plurality of tiles surrounding said aperture, each tile having a shape of a square and a HEX value for providing a comparison and contrast against the sample of human skin; each of said barcode regions filling a respective corner area; wherein each barcode region is spaced diagonally from said aperture along a pair of perpendicular diagonal axes; said plurality of tiles comprising: a first set of tiles, wherein: a first portion of each tile is white, and a second portion of each tile has a HEX value representing a shade of grey-scale; a second set of tiles, wherein: each tile has a HEX value representing a same shade of grey; a set of four zones, each zone positioned among said first set and said second set of tiles for a respective edge of said card, and comprising: a first color tile and a second color tile, each having a HEX value representing a color other than both (i) a shade of grey-scale and a (ii) HEX value corresponding to a tone of human skin; said first color tile and said second color tile each also having an outer-inside corner and an inner-inside corner, with respect to said center point of said aperture; wherein said first color tile and said second color tile are positioned non-adjacent to each other such that an angle as measured between said outer-inside corner of both color tiles and said center point of said aperture ranges from 40° to 50°; and a plurality of skin-toned tiles, each having a HEX value representing a tone of human skin.

Example 18

Said card of Example 17, wherein: said first set of tiles has twenty such tiles arranged into four groups of such tiles adjacent to a respective edge of said card, between two respective barcode regions; each group has a first tile, a second tile, a third tile, a fourth tile, and a fifth tile; and said first portion of each such tile faces said respective edge of said card, and said second portion of each such tile faces towards said aperture.

Example 19

Said card of any of Examples 17 through 18, wherein: said second set of tiles has twenty such tiles, each with a HEX value of BFBFBF; a first subset of said second set of tiles includes twelve such tiles that are respectively adjacent to, and facing said second portion of, one of said first tile, said third tile, and said fifth tile from a respective group of said first set of tiles; a second subset of said second set of tiles includes four such tiles that are each positioned diagonally-adjacent between a respective corner of said aperture and a respective corner area; and a third subset of said second set of tiles includes four such tiles that are each adjacent a respective edge of said aperture, aligned with said center point of said aperture.

Example 20

Said card of any of Examples 17 through 19, wherein for each of said set of four zones: a first of said skin-toned tiles is adjacent said aperture, between a respective tile of said second subset and said third subset of said second set of tiles, and aligned with said first color tile; a second of said skin-toned tiles is adjacent said aperture, between a respective tile of said second subset and said third subset of said second set of tiles, and aligned with said second color tile; a third of said skin-toned tiles is positioned between a respective tile of said first subset and said second subset of said second set of tiles, aligned with said first tile of said first set of tiles, adjacent a respective corner area, and diagonally-adjacent said outer-inside corner of said first color tile; a fourth of said skin-toned tiles is positioned between said first skin-toned tile and said first color tile; a fifth of said skin-toned tiles is positioned between a respective tile of said first subset and said third subset of said second set of tiles, aligned with said third tile of said first set of tiles, and diagonally-adjacent said inner-inside corner of both said first color tile and said second color tile; a sixth of said skin-toned tiles is positioned between said second skin-toned tile and said second color tile; a seventh of said skin-toned tiles is positioned between a respective tile of said first subset and said second subset of said second set of tiles, aligned with said fifth tile of said first set of tiles, adjacent a respective corner area, and diagonally-adjacent said outer-inside corner of said second color tile; and said HEX value from one skin-toned tile to a next skin-toned tile, in the counterclockwise direction, represents an increase in amount of pigmentation of human skin.

Example 21

A method of identifying a skin tone of a sample of human skin using a card, the method comprising: (a) positioning the card relative to the sample of human skin; (b) capturing an image of the sample of the human skin positioned within an aperture of the card; and (c) identifying the skin tone based on the image.

Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A card for identifying a tone of a sample of human skin, said card comprising:
   (a) an aperture for allowing the sample of human skin to be viewed therethrough, said aperture centered at a center point;
   (b) a plurality of barcode regions for identifying said card as unique from another such card and for identifying a layout and orientation of said card; and
   (c) a plurality of tiles, surrounding said aperture, for providing a comparison and contrast against the sample of human skin;
   wherein said plurality of tiles comprises:
   (i) a first set of tiles, each having a HEX value representing a shade of grey-scale,
   (ii) a second set of tiles, each having a HEX value representing a same shade of grey;
   (iii) a plurality of skin-toned tiles each having a HEX value representing a tone of human skin, and
   (iv) a plurality of color tiles arranged in a set of four zones, each zone positioned among said first set and said second set of tiles;
   wherein each zone comprises a first color tile and a second color tile, each having a HEX value representing a color different from any of (i) said first set of tiles, (ii) said second set of tiles, and (iii) said plurality of skin-toned tiles;
   wherein:
   said first color tile and said second color tile each have an outer-inside corner;
   said first color tile and said second color tile are positioned non-adjacent to each other such that an angle as measured between said outer-inside corner of both color tiles and said center point of said aperture ranges from 30° to 60°.

2. Said card of claim 1, wherein said aperture is from 4 to 10 times larger in area than each of said plurality of tiles.

3. Said card of claim 1, wherein said aperture has a shape of a square having four edges and four corners.

4. Said card of claim 1, wherein each barcode region is spaced diagonally from said aperture along a pair of perpendicular diagonal axes.

5. Said card of claim 1, wherein each barcode region has an ArUco barcode.

6. Said card of claim 1, wherein said first color tile and said second color tile are positioned non-adjacent to each other such that said angle is 45°.

7. Said card of claim 1, wherein:
   said first set of tiles has twenty such tiles arranged into four groups of such tiles adjacent to a respective edge of said card, between two respective barcode regions;
   each group has a first tile, a second tile, a third tile, a fourth tile, and a fifth tile; and
   said first portion of each such tile faces said respective edge of said card, and said second portion of each such tile faces towards said aperture.

8. Said card of claim 7, wherein said first set of tiles has a HEX value of grey-scale that decreases from CDCDCD to 000000 in a counterclockwise direction, from said first tile to said fifth tile.

9. Said card of claim 8, wherein for each group of said first set of tiles:

said first tile has a second portion with a HEX value of CDCDCD;
said second tile has a second portion with a HEX value of 9A9A9A;
said third tile has a second portion with a HEX value of 666666;
said fourth tile has a second portion with a HEX value of 333333; and
said fifth tile has a second portion with a HEX value of 000000.

10. Said card of claim 9, wherein:
said second set of tiles has twenty such tiles, each with a HEX value of BFBFBF;
a first subset of said second set of tiles includes twelve such tiles that are respectively adjacent to, and facing said second portion of, one of said first tile, said third tile, and said fifth tile from a respective group of said first set of tiles;
a second subset of said second set of tiles includes four such tiles that are each positioned diagonally-adjacent between a respective corner of said aperture and a respective corner area; and
a third subset of said second set of tiles includes four such tiles that are each adjacent a respective edge of said aperture, aligned with said center point of said aperture.

11. Said card of claim 10, wherein, in the counterclockwise direction, said first color tile is adjacent and facing said second portion of said second tile, and said second color tile is adjacent and facing said second portion of said fourth tile, of a respective group of said first set of tiles.

12. Said card of claim 11, wherein each of said plurality of color tiles has a unique HEX value.

13. Said card of claim 12, wherein, in the counterclockwise direction:
in a first zone of said set of four zones, said first color tile has a HEX value of BF309B, and said second color tile has a HEX value of BF3030;
in a second zone of said set of four zones, said first color tile has a HEX value of BF9B30, and said second color tile has a HEX value of 78BF30;
in a third zone of said set of four zones, the first color tile has a HEX value of 30BF54, and said second color tile has a HEX value of 30BFBF; and
in a fourth zone of said set of four zones, said first color tile has a HEX value of 3054BF, and said second color tile has a HEX value of 7830BF.

14. Said card of claim 13, wherein for each of said set of four zones, said plurality of skin-toned tiles includes seven tiles.

15. Said card of claim 14, wherein for each of said set of four zones:
a first tile of said skin-toned tiles is adjacent said aperture, between a respective tile of said second subset and said third subset of said second set of tiles, and aligned with said first color tile;
a second tile of said skin-toned tiles is adjacent said aperture, between a respective tile of said second subset and said third subset of said second set of tiles, and aligned with said second color tile;
a third tile of said skin-toned tiles is positioned between a respective tile of said first subset and said second subset of said second set of tiles, aligned with said first tile of said first set of tiles, adjacent a respective corner area, and diagonally-adjacent said outer-inside corner of said first color tile;
a fourth tile of said skin-toned tiles is positioned between said first skin-toned tile and said first color tile;

a fifth tile of said skin-toned tiles is positioned between a respective tile of said first subset and said third subset of said second set of tiles, aligned with said third tile of said first set of tiles, and diagonally-adjacent the inner-inside corner of both said first color tile and said second color tile;

a sixth tile of said skin-toned tiles is positioned between said second skin-toned tile and said second color tile;

a seventh tile of said skin-toned tiles is positioned between a respective tile of said first subset and said second subset of said second set of tiles, aligned with said fifth tile of said first set of tiles, adjacent a respective corner area, and diagonally-adjacent said outer-inside corner of said second color tile; and said HEX value between adjacent skin-toned tiles, in the counterclockwise direction, represents an increase in amount of pigmentation of the human skin.

16. Said card of claim 15, wherein:

in said first of said set of four zones, said first of said skin-toned tiles has a HEX value of A0765A, said second of said skin-toned tiles has a HEX value of 876249, said third of said skin-toned tiles has a HEX value of AA8B6D, said fourth of said skin-toned tiles has a HEX value of 99795D, said fifth of said skin-toned tiles has a HEX value of 846349, said sixth of said skin-toned tiles has a HEX value of 654D3E, and said seventh of said skin-toned tiles has a HEX value of 544338;

in said second of said set of four zones, said first of said skin-toned tiles has a HEX value of C3A38F, said second of said skin-toned tiles has a HEX value of BB9983, said third of said skin-toned tiles has a HEX value of C8AC99, said fourth of said skin-toned tiles has a HEX value of C7A896, said fifth of said skin-toned tiles has a HEX value of C6A098, said sixth of said skin-toned tiles has a HEX value of C1958C, and said seventh of said skin-toned tiles has a HEX value of BE9186;

in said third of said set of four zones, said first of said skin-toned tiles has a HEX value of 976C52, said second of said skin-toned tiles has a HEX value of 775642, said third of said skin-toned tiles has a HEX value of B58678, said fourth of said skin-toned tiles has a HEX value of A57461, said fifth of said skin-toned tiles has a HEX value of 895F4D, said sixth of said skin-toned tiles has a HEX value of 63483E, and said seventh of said skin-toned tiles has a HEX value of 544239; and in said fourth of said set of four zones, said first of said skin-toned tiles has a HEX value of C5A691, said second of said skin-toned tiles has a HEX value of BE9D86, said third of said skin-toned tiles has a HEX value of C9AD95, said fourth of said skin-toned tiles has a HEX value of C5A991, said fifth of said skin-toned tiles has a HEX value of C0A48D, said sixth of said skin-toned tiles has a HEX value of B89A7E, and said seventh of said skin-toned tiles has a HEX value of B19175.

17. A card, for identifying a tone of a sample of human skin, comprising:

said card having a shape of a square with four edges, four corners, an area, and four corner areas positioned at a respective corner;

wherein each of said corner areas is a portion of said area, positioned at a respective corner, and are all of a same size;

a group of four barcode regions, for identifying said card as unique from another such card, and for identifying a layout and orientation of said card;

an aperture, for placement over the sample of human skin, centered around a center point;

wherein said aperture has a shape of a square, four edges, and four corners;

a plurality of tiles surrounding said aperture, each tile having a shape of a square and a HEX value for providing a comparison and contrast against the sample of human skin;

each of said barcode regions filling a respective corner area;

wherein each barcode region is spaced diagonally from said aperture along a pair of perpendicular diagonal axes;

said plurality of tiles comprising:

a first set of tiles, wherein:

a first portion of each tile is white, and a second portion of each tile has a HEX value representing a shade of grey-scale;

a second set of tiles, wherein:

each tile has a HEX value representing a same shade of grey;

a set of four zones, each zone positioned among said first set and said second set of tiles for a respective edge of said card, and comprising:

a first color tile and a second color tile, each having a HEX value representing a color other than both (i) a shade of grey-scale and a (ii) HEX value corresponding to a tone of human skin;

said first color tile and said second color tile each also having an outer-inside corner and an inner-inside corner, with respect to said center point of said aperture;

wherein said first color tile and said second color tile are positioned non-adjacent to each other such that an angle as measured between said outer-inside corner of both color tiles and said center point of said aperture ranges from 40° to 50°; and a plurality of skin-toned tiles, each having a HEX value representing a tone of human skin.

18. Said card of claim 17, wherein:

said first set of tiles has twenty such tiles arranged into four groups of such tiles adjacent to a respective edge of said card, between two respective barcode regions;

each group has a first tile, a second tile, a third tile, a fourth tile, and a fifth tile; and said first portion of each such tile faces said respective edge of said card, and said second portion of each such tile faces towards said aperture.

19. Said card of claim 17, wherein:

said second set of tiles has twenty such tiles, each with a HEX value of BFBFBF;

a first subset of said second set of tiles includes twelve such tiles that are respectively adjacent to, and facing said second portion of, one of said first tile, said third tile, and said fifth tile from a respective group of said first set of tiles;

a second subset of said second set of tiles includes four such tiles that are each positioned diagonally-adjacent between a respective corner of said aperture and a respective corner area; and a third subset of said second set of tiles includes four such tiles that are each adjacent a respective edge of said aperture, aligned with said center point of said aperture.

20. Said card of claim 17, wherein for each of said set of four zones:
- a first of said skin-toned tiles is adjacent said aperture, between a respective tile of said second subset and said third subset of said second set of tiles, and aligned with said first color tile;
- a second of said skin-toned tiles is adjacent said aperture, between a respective tile of said second subset and said third subset of said second set of tiles, and aligned with said second color tile;
- a third of said skin-toned tiles is positioned between a respective tile of said first subset and said second subset of said second set of tiles, aligned with said first tile of said first set of tiles, adjacent a respective corner area, and diagonally-adjacent said outer-inside corner of said first color tile;
- a fourth of said skin-toned tiles is positioned between said first skin-toned tile and said first color tile;
- a fifth of said skin-toned tiles is positioned between a respective tile of said first subset and said third subset of said second set of tiles, aligned with said third tile of said first set of tiles, and diagonally-adjacent said inner-inside corner of both said first color tile and said second color tile;
- a sixth of said skin-toned tiles is positioned between said second skin-toned tile and said second color tile;
- a seventh of said skin-toned tiles is positioned between a respective tile of said first subset and said second subset of said second set of tiles, aligned with said fifth tile of said first set of tiles, adjacent a respective corner area, and diagonally-adjacent said outer-inside corner of said second color tile; and
- said HEX value from one skin-toned tile to a next skin-toned tile, in the counterclockwise direction, represents an increase in amount of pigmentation of human skin.

* * * * *